(12) United States Patent
Copic et al.

(10) Patent No.: US 12,054,839 B2
(45) Date of Patent: Aug. 6, 2024

(54) COMPOSITE LAYERS, METHODS FOR THEIR MANUFACTURE AND USES THEREOF

(71) Applicant: Cambridge Enterprise Limited, Cambridge (GB)

(72) Inventors: Davor Copic, Cambridge (GB); Michael Franciscus De Volder, Cambridge (GB); Jan Johan Rongé, Overijse (BE)

(73) Assignee: Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 18/367,328

(22) Filed: Sep. 12, 2023

(65) Prior Publication Data
US 2023/0416938 A1     Dec. 28, 2023

Related U.S. Application Data

(62) Division of application No. 16/606,202, filed as application No. PCT/EP2018/060983 on Apr. 27, 2018, now abandoned.

(30) Foreign Application Priority Data

Apr. 28, 2017   (GB) ..................... 1706783

(51) Int. Cl.
  *C25D 15/00* (2006.01)
  *B82Y 30/00* (2011.01)
  (Continued)

(52) U.S. Cl.
  CPC .............. *C25D 15/00* (2013.01); *B82Y 30/00* (2013.01); *C25D 1/16* (2013.01); *C25D 7/00* (2013.01);
  (Continued)

(58) Field of Classification Search
  CPC ....... Y02E 60/10; F28D 15/046; B82Y 30/00; H01M 4/666; C25D 1/16; C25D 13/02; C25D 7/00; C25D 15/00
  See application file for complete search history.

(56) References Cited

U.S. PATENT DOCUMENTS

2007/0036978 A1   2/2007   Chen
2011/0127013 A1   6/2011   Kawamura et al.
(Continued)

FOREIGN PATENT DOCUMENTS

CN   102185131   9/2013
JP   2008163376   7/2008
(Continued)

OTHER PUBLICATIONS

Ludovic Dumee et al (2011) "Control of Porosity and Pore Size of Metal Reinforced Carbon Nanotube Membranes," Membranes, 1(1): 25-36.

*Primary Examiner* — Vishal V Vasisth
(74) *Attorney, Agent, or Firm* — Rudy J. Ng; Bozicevic, Field & Francis LLP

(57) ABSTRACT

A composite layer of carbon nanotubes and metal such as copper is formed by electrodeposition. The layer has a thickness of at least 10 μm. The carbon nanotubes are distributed through the layer and are present in the layer at a volume fraction of at least 0.001 vol % and at most 65 vol %. The volume fraction is based on the total volume of the metal and carbon nanotubes and not including any pore volume. The carbon nanotubes are substantially uniformly plated with the metal. The composite layer has a density ratio satisfying Player Pmetal ≤0.35 where player is the bulk density of the composite layer of thickness of at least 10 μm, including any voids that are present in the composite layer and pmetal is the volumetric mass density material property of the metal. The composite layer is of use in evaporation-
(Continued)

condensation apparatus, as an active material layer in an electrochemical device or in an electroforming process.

8 Claims, 19 Drawing Sheets

(51) Int. Cl.
  *C25D 1/16* (2006.01)
  *C25D 7/00* (2006.01)
  *C25D 13/02* (2006.01)
  *F28D 15/04* (2006.01)
  *H01M 4/66* (2006.01)

(52) U.S. Cl.
  CPC ............ *C25D 13/02* (2013.01); *F28D 15/046* (2013.01); *H01M 4/666* (2013.01)

(56) References Cited

U.S. PATENT DOCUMENTS

2013/0299212 A1* 11/2013 Hata .................... C25D 5/54
  174/126.2
2014/0348450 A1* 11/2014 Kachoosangi .......... F16C 33/14
  205/252

FOREIGN PATENT DOCUMENTS

| | | |
|---|---|---|
| JP | 2010267744 | 11/2010 |
| KR | 20100138317 | 12/2010 |

* cited by examiner

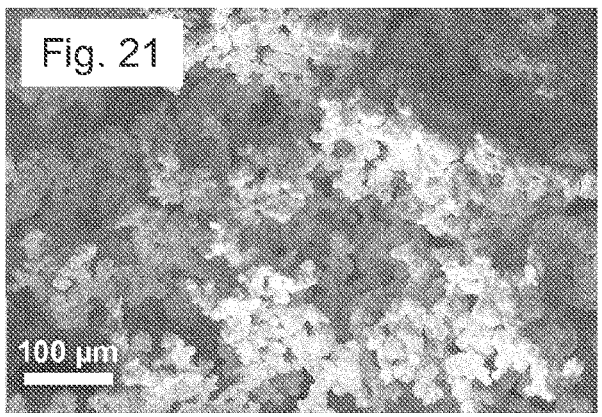
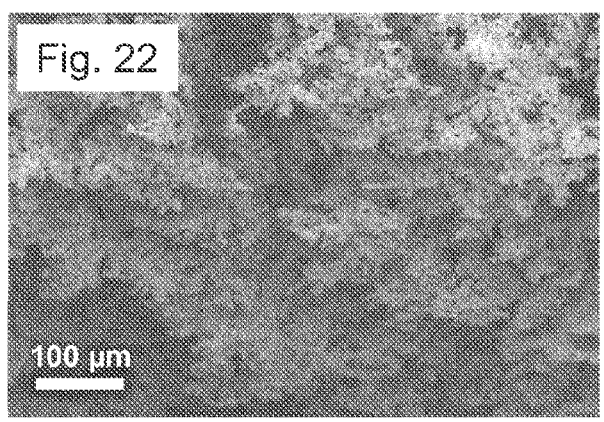
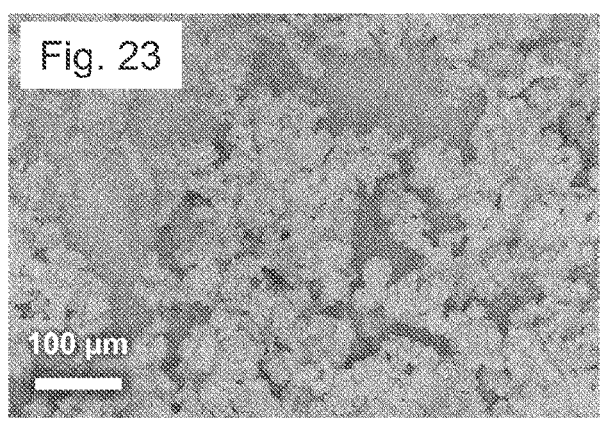

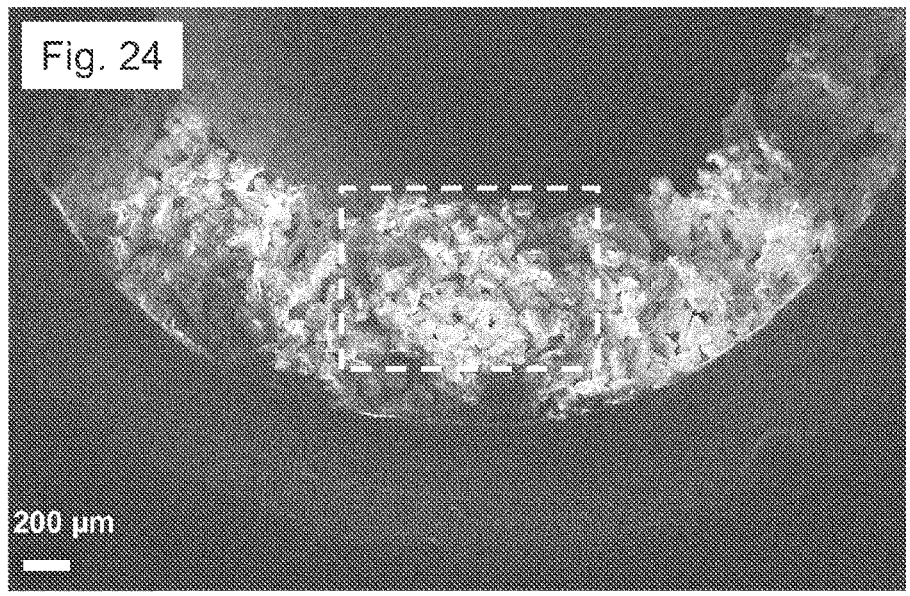
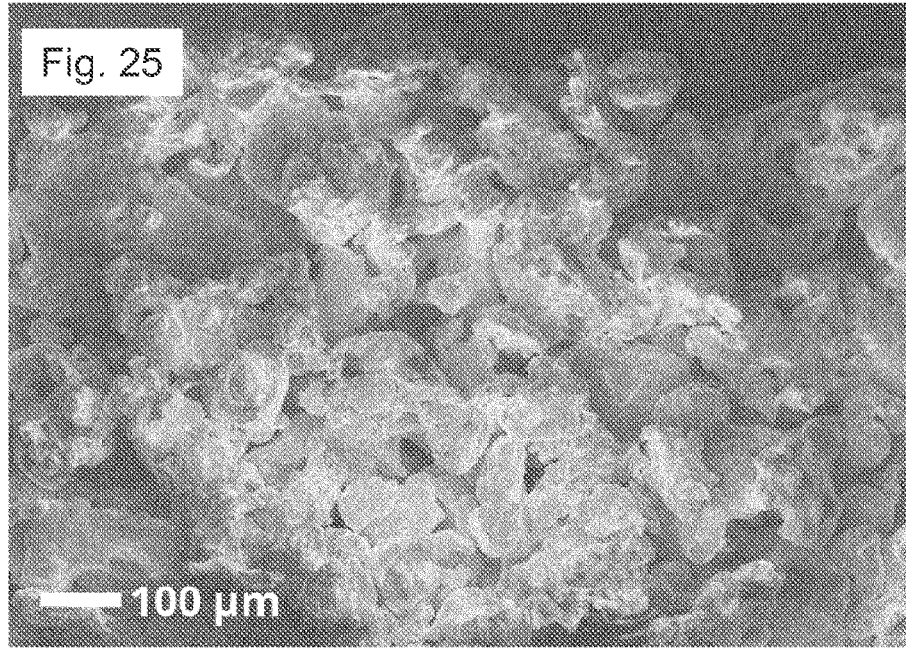

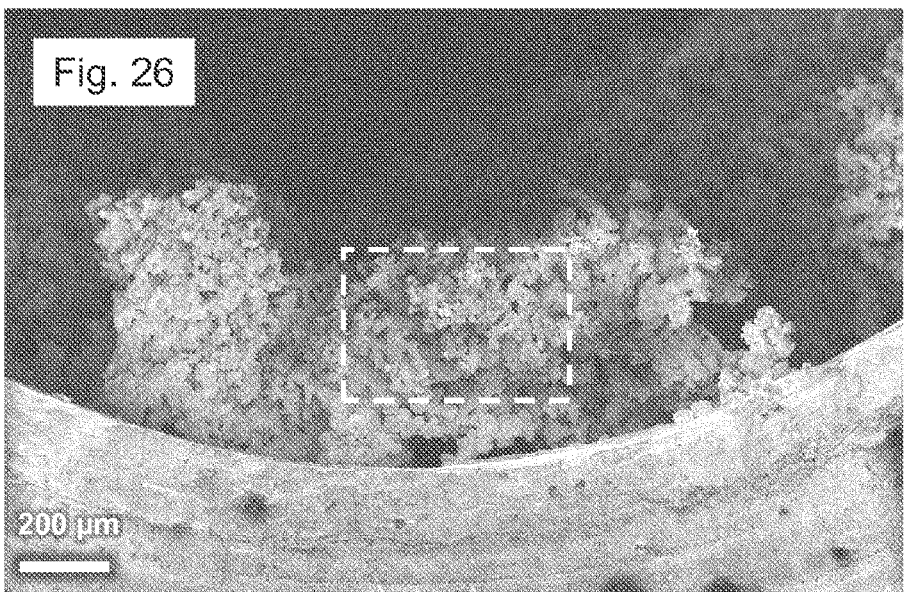
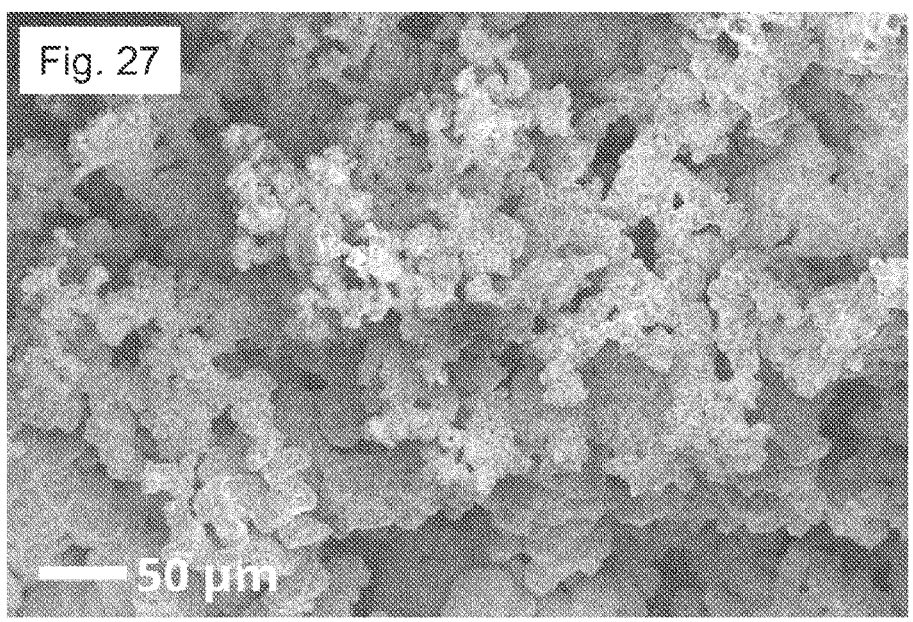

COMPOSITE LAYERS, METHODS FOR THEIR MANUFACTURE AND USES THEREOF

This application is a DIV of Ser. No. 16/606,202, filed Oct. 17, 2019, now abandoned wherein U.S. patent application Ser. No. 16/606,202 is a 371 of PCT/EP2018/060983, filed Apr. 27, 2018.

BACKGROUND TO THE INVENTION

Field of the Invention

The present invention relates to composite layers, methods for the manufacture of composite layers and uses of such composite layers. The present invention has particular applicability to composites formed of an electroplatable metal and carbon nanotubes.

Related Art

Electroplating is known for the deposition of metal, alloy, ceramic, and composite films for integrated circuits, magnetic recording devices, and other applications. Improved control of process conditions has enabled electroplating to be applied on the micron scale as part of a number of robust microelectromechanical systems (MEMS) fabrication processes typically using copper, nickel, or gold to plate lithographically patterned microstructures. Specifically, LIGA [Bley (2013)] has been used to fabricate numerous high precision microscale components (gears, bearings, motors, turbines, nozzles, actuators, sensors, etc.) simultaneously over large areas with submicron structural details, lateral dimensions of a few microns, and thicknesses up to thousands of microns. On these scales the deposition rates and thickness, which are the main disadvantages of electroforming, are not limiting. However, attempts to expand LIGA into a 3D fabrication process on the millimeter scale [Jing et al (2007)] are shown to be cost prohibitive and slow.

Further improvements in control of local deposition and material properties of electroformed parts are enabled by a variety of electrochemical additives. Specifically, plating rate in areas of high current density is slowed by leveling agents and deposition uniformity is improved by inhibitors. Electrochemical additives can also be used to reduce residual stresses and refine the deposited grain structure, improving material properties. Various nanoparticles can also act as additives and integrate into deposited thin films to form nanocomposites. These have been shown to increase hardness and corrosion resistance [Low et al (2006)]. in general, nanocomposites are attractive due the potential for increased strength, stiffness, and elongation at break [Chai et al (2008)]. Electroplated composites can show an improved current carrying capacity [Subramaniam et al (2013)] and thermal conductivity [Subramaniam et al (2014)]. Such composites are produced by electroplating copper onto preassembled carbon nanotubes.

Electroforming was one of the first production processes to employ electroplating and is used to produce robust 3D parts by coating a mandrel or mold via electrodeposition and subsequently separating the deposited metal, which forms a free-standing part. Electroforming has found wide industrial use due to its high fidelity and ability to produce complex parts at various length scales. At very large length scales electroforming avoids the cost and difficulty of machining thin-walled parts (such as aircraft wing skin), while at small length scales extremely accurate parts can be fabricated (such as CD, DVD, and Blu-ray disc replication) due to its high dimensional tolerance and ability to reproduce submicron surface detail. Electroforming can also be applied to continuous processes and is used in the production of continuous and perforated foils and meshes.

Lee et al (2011) disclose an electrophoretic deposition process in which an interconnected formicary-like network of carbon nanotubes and copper nanoparticles is formed. The copper nanoparticles nucleate and grow primarily at the carbon nanotubes crossing and edge contact locations. The network is formed attached to carbon fibers.

Arai et al (2004) disclose an approach to form a powder of Ni-deposited multiwall carbon nanotubes (MWCNTs). A Ni plating bath is provided with homogeneously dispersed MWCNTs. The resulting structure is described as a "skewered dumpling structure" in which deposited Ni particles are skewered by the carbon nanotubes.

Arai et al (2010) disclose the formation of composite layers formed of Cu and MWCNTs by electrodeposition. The MWCNTs were vapour grown via CVD and were heat treated at 2800° for 30 mins. The MWCNTs were dispersed in a sulfuric copper plating path—a homogeneous dispersion was made possible only by the inclusion of a poly(acrylic acid) dispersant. The resultant morphology of the deposited layer was of relative large Cu particles skewered with CNTs.

Manu and Priya (2013) disclose the fabrication of a densely populated MWCNT-Cu film via electrochemical deposition. Various surface morphologies were demonstrated, from a stacked layer structure of Cu-MWCNT to vertical alignment of MWCNT.

Chai et al (2008) discloses the formation of CNT reinforced copper nanocomposites. These are formed in a dense format, suitable for the stress-strain testing adopted in that paper.

CN104233379, CN102140668, WO2011005693 and CN104611735 disclose the addition of CNTs to a copper plating solution in order to change the way that copper electrodeposition is performed. Mechanical activation of the surface is required, as is the addition of a surfactant. The concentration of CNTs used in the plating solution is 0.1-1 g/L. The outcome of the process is a CNT-Cu composite powder. According to the SEM and TEM disclosure in CN104233379 the powder appears to be composed of round Cu particles with heterogeneously dispersed CNTs.

In the prior art, it is found that copper electroplating with incorporation of CNTs can have the effect of forming Cu particles with embedded CNTs, at relatively low volumetric rates. However, it is considered by the present inventors that the morphology and volumetric layer formation rates are susceptible of improvement.

SUMMARY OF THE INVENTION

The present inventors consider that known techniques are not capable of forming robust metal-nanotube composite materials. Bulk processing of carbon nanotube (CNT) composites typically results in weak material properties. This is considered to be due to stress concentrations created by non-uniform CNT distribution. Additionally, this is considered to be due to lack of nanoscale and microscale structural control. Furthermore, It appears that weak material matrices may contribute to weak overall composite properties. Still further, comparatively poor inter-particle and matrix-particle interactions may also contribute to weak overall composite properties.

The present invention has been devised in order to address at least one of the above problems. Preferably, the present invention reduces, ameliorates, avoids or overcomes at least one of the above problems.

The present inventors have found that it is possible to provide a fast electrodeposition process. They have found that using carbon nanotubes as an electrodeposition additive enhances the rate and deposition thickness of electroplated metal-nanotube composite layers, and provides additional technical benefits.

Accordingly, in a first preferred aspect, the present invention provides a composite layer of carbon nanotubes and metal, the layer having thickness of at least 10 µm, the carbon nanotubes being distributed through the layer and being present in the layer at a volume fraction of at least 0.001 vol % and at most 65 vol %, the volume fraction being based on the total volume of the metal and carbon nanotubes and not including any pore volume.

In a second preferred aspect, the present invention provides a process for manufacturing a composite layer of carbon nanotubes and metal, the process comprising the steps:
providing carbon nanotubes;
dispersing the carbon nanotubes in an electrolyte solution;
providing a working electrode and a counter electrode comprising the metal, each in contact with the electrolyte; and
electroplating the working electrode with the carbon nanotubes and metal to grow the composite layer at a rate of change of thickness of the composite layer of at least 10 µm/min to a thickness of at least 10 µm;
wherein, for at least a part of the process, the composite layer of thickness of at least 10 µm has a density ratio satisfying:

$$\frac{\rho_{layer}}{\rho_{metal}} \leq 0.35$$

where $\rho_{layer}$ is the bulk density of the composite layer of thickness of at least 10 µm, including any voids that are present in the composite layer and $\rho_{metal}$ is the volumetric mass density material property of the metal.

In a third preferred aspect, the present invention provides an evaporation-condensation apparatus for the transfer of heat, the apparatus comprising a closed container having an evaporator region and a condenser region, the container having a wicking layer formed on an internal surface of the container and a working fluid contained in the container, wherein the wicking layer comprises a composite layer of carbon nanotubes and metal according to the first aspect, evaporation of the working fluid at the evaporator region, the mass transport of the evaporated working fluid from the evaporator region to the condenser region and the condensation of the working fluid at the condenser region contributing to the transfer of heat, the condensed working fluid being transported back to the evaporator region along the wicking layer.

In a fourth preferred aspect, the present invention provides an electrochemical device comprising an anode, electrolyte and cathode, wherein at least one of the anode and cathode includes an active material layer and a current collecting layer, wherein the current collecting layer is a composite layer of carbon nanotubes and metal according to the first aspect.

In a fifth preferred aspect, the present invention provides an electroforming process comprising the steps:
providing a composite layer of carbon nanotubes and metal according to the first aspect, or carrying out a process according to the second aspect to manufacture a composite layer of carbon nanotubes and metal;
carrying out additional electroplating of a metal into the composite layer to produce an electroformed product.

The first, second, third, fourth and/or fifth aspect of the invention may have any one or, to the extent that they are compatible, any combination of the following optional features.

The composite layer of carbon nanotubes and metal may have a thickness of at least 20 µm, at least 30 µm, at least 40 µm, at least 50 µm, at least 60 µm, at least 70 µm, at least 80 µm, at least 90 µm, or at least 100 µm. In prior art composite layers formed by electroplating techniques, forming thick layers can be time consuming and the layers do not provide similar morphology to that seen in the preferred embodiments of the present invention. The composite layer of carbon nanotubes and metal may have a thickness of at least 0.2 mm, at least 0.3 mm, at least 0.4 mm, at least 0.5 mm, or at least 0.6 mm.

Preferably, the carbon nanotubes are uniformly distributed through the layer. This is preferred in view of the resultant uniform mechanical, electrical and thermal properties.

The volume fraction of carbon nanotubes in the composite layer may be at least 0.01 vol %, more preferably at least 0.1 vol %, more preferably at least 1 vol %, still more preferably at least 5 vol %.

As will be understood, the volume fraction of carbon nanotubes, when assessed in relation to the volume of the composite material excluding pores, is affected by the porosity, to the extent that a reduced porosity typically means that more metal is present, e.g. plated into the porosity by further electroplating.

The volume fraction of carbon nanotubes in the composite layer may be at most 50 vol %, at most 40 vol %, or at most 30 vol %.

The weight fraction of carbon nanotubes in the composite layer may be at least 0.001 wt %, based on the mass of the composite material. More preferably, the weight fraction of carbon nanotubes in the composite layer may be at least 0.01 wt %, more preferably at least 0.1 wt %, more preferably at least 1 wt %.

The weight fraction of carbon nanotubes in the composite layer may be at most 20 wt %, at most 15 wt %, or at most 10 wt %.

Preferably, the carbon nanotubes are substantially uniformly plated with the metal. This can be assessed, for example, by transmission electron microscopy (TEM). It is found in the preferred embodiments of the present invention that the morphology of the composite material is different from that of the prior art. In the prior art, there are formed clumped metal particles, so that the morphology of the CNTs and the metal particles resembles dumplings (the metal particles) on skewers (the CNTs).

Preferably, the carbon nanotubes are substantially uniformly plated with the metal to the extent that the composite material substantially does not include exposed carbon nanotubes. That is, under TEM examination, all of the carbon nanotubes are preferably coated with at least a thin layer of metal.

The metal may be one selected from the group consisting of: Antimony, Arsenic, Bismuth, Cadmium, Chromium, Cobalt, Copper, Gold, indium, Iridium, Iron, Lead, Manganese, Nickel, Osmium, Palladium, Platinum, Rhenium, Rhodium, Ruthenium, Selenium, Silver, Tellurium, Thallium, Tin, Zinc, and alloys thereof, including alloys containing Cerium, Gadolinium, Lanthanum, Neodymium, Praseodymium, Samarium, Yttrium. Suitable metals include those than can conveniently be electroplated in aqueous solutions. Of these, copper is particularly preferred in view of its ease of electroplating and in view of its electrical and thermal characteristics.

The composite layer may have a density ratio satisfying:

$$\frac{\rho_{layer}}{\rho_{metal}} \leq 0.35$$

where $\rho_{layer}$ is the bulk density of the composite layer of thickness of at least 10 µm, including any voids that are present in the composite layer and $\rho_{metal}$ is the volumetric mass density material property of the metal.

Thus, for at least a part of the process, when a thickness of 10 µm is reached, the layer has a relatively low density. The density is expressed here in terms of the ratio of the bulk density of the layer (i.e. including voids (porosity)) to the density of the metal (this being the materials property of the metal, rather than the bulk density of the metal). Taking as an example the composite layer formed of copper and CNTs and having an area density of about 0.05 mg/mm² and a thickness of about 100 µm, this would represent $$\frac{\rho_{layer}}{\rho_{metal}} = \frac{500}{9000} = 0.056.$$

More preferably, the composite layer may have a density ratio satisfying:

$$\frac{\rho_{layer}}{\rho_{metal}} \leq 0.3$$

More preferably, the composite layer may have a density ratio satisfying:

$$\frac{\rho_{layer}}{\rho_{metal}} \leq 0.2$$

More preferably the composite layer may have a density ratio satisfying:

$$\frac{\rho_{layer}}{\rho_{metal}} \leq 0.15$$

More preferably the composite layer may have a density ratio satisfying:

$$\frac{\rho_{layer}}{\rho_{metal}} \leq 0.1$$

In some alternative embodiments, the density ratio of the composite layer may be higher than the ranges specified above. This may be achieved for example by using a relatively low concentration of CNTs in the electrolyte and/or by using a deposition voltage that is relatively low (in terms of magnitude). In such alternative embodiments, the density ratio may be greater than 0.35. For example, the density ratio may be up to 0.8, or up to 0.75.

During electroplating the working electrode with the growing composite layer, the rate of change of thickness of the composite layer may be at least 20 µm/min. The rate of change of thickness of the composite layer may be at least 30 µm/min, at least 40 µm/min, at least 50 µm/min, or at least 60 µm/min.

Preferably, during electroplating the working electrode with the carbon nanotubes and metal to grow the composite layer at a rate of change of thickness of the composite layer of at least 10 µm/min, the rate of change of area density is at most 1.6 kg/m²/min, or at most 1.0 kg/m²/min or at most 0.8 kg/m²/min. More preferably, the rate of change of area density is at most 0.5 kg/m²/min, at most 0.4 kg/m²/min, at most 0.3 kg/m²/min, at most 0.2 kg/m²/min, or at most 0.1 kg/m²/min.

In some embodiments, during electroplating the working electrode with the carbon nanotubes and metal to grow the composite layer, the magnitude of the current density is controlled. At an initial stage of the electroplating, the current density may be relatively high, e.g. at least 3 mA/mm². Subsequently, the current density may be reduced to be relatively lower, e.g. at most 2.5 mA/mm².

Preferably, the carbon nanotubes have covalent and/or non-covalent functionalisation. Covalent functionalisation is preferred due to stronger interaction.

Suitable functional groups may fall into one or more of the following categories: water soluble (hydrophilic), charged, surfactant-like (anionic, cationic, and non-ionic), acid containing, and metal complexing/chelating groups.

Preferably, the carbon nanotubes are functionalised with at least one selected from the group consisting of:
Hydroxyl, Phenol, Carbonyl, Carboxylate, Carboxyl, Phosphate, Phosphono, Sulfonic acid, Sulfhydryl, Sulfide, Disulfide, Amino, Quaternary ammonium.

The degree of functionalisation of the carbon nanotubes may be at least 1 wt %. More preferably, the degree of functionalisation of the carbon nanotubes may be at least 2 wt %, at least 3 wt %, at least 4 wt % or at least 5 wt %. A degree of functionalisation below 1 wt % is considered to be less effective in suspending the CNTs in water. Additionally, this can have an effect on whether the CNT has sufficient charge to migrate primarily to the WE.

The electrolyte, at least at the start of deposition, may contain at least 0.0001 wt % carbon nanotubes. Below this limit, the advantageous effects of carbon nanotubes in the present invention are less apparent. The electrolyte, at least at the start of deposition, may contain not more than 0.2 wt % carbon nanotubes, more preferably not more than 0.1 wt % carbon nanotubes. Above this limit, it is found that it is difficult to maintain the CNTs in suspension in the electrolyte.

The electrolyte, at least at the start of deposition, may have a concentration of the metal of at least 0.05 M. More preferably, the concentration of the metal may be at least 0.2 M. The concentration of the metal may be up to 0.8 M, for example. More preferably, the concentration of the metal may be up to 0.5 M. In alternative embodiments, the concentration of the metal in the electrolyte at the start of deposition is higher, such as up to 1.0M or up to 1.2M. These produce satisfactory composite layers, with higher concentrations tending to result in composite layers of higher density.

In some embodiments, the evaporation-condensation apparatus according to the third aspect is in the form of a heat pipe.

In some embodiments, the evaporation-condensation apparatus according to the third aspect is in the form of a vapour chamber.

Further optional features of the invention are set out below.

BRIEF DESCRIPTION OF THE DRAWINGS

Embodiments of the invention will now be described by way of example with reference to the accompanying drawings in which:

In FIG. 12, it is shown that sequential depositions do not recover initial high deposition rates, unless the porous CNT-copper nanocomposites are backfilled (ex situ paraffin wax filling).

FIGS. 21-23 demonstrate a series of SEM images showing that the morphology of the deposited layer is affected by the current density. The deposited layer of FIG. 21 was deposited using a current density of −3.7 $mA/mm^2$. The deposited layer of FIG. 22 was deposited using a current density of −2.6 $mA/mm^2$. The deposited layer of FIG. 23 was deposited using a current density of −1.8 $mA/mm^2$.

FIG. 24 shows a relatively low magnification SEM image of a partial cross section through a heat pipe with a commercial sintered Cu powder coating layer.

FIG. 25 shows an enlarged view of the area indicated in FIG. 24 using a white dashed line box.

FIG. 26 shows a relatively low magnification SEM image of a partial cross section through a heat pipe according to an embodiment of the invention with a highly porous Cu-CNT deposited layer.

FIG. 27 shows an enlarged view of the area indicated in FIG. 26 using a white dashed line box.

DETAILED DESCRIPTION OF THE PREFERRED EMBODIMENTS, AND FURTHER OPTIONAL FEATURES OF THE INVENTION

The preferred embodiments of the present invention provide fast electrodeposition processes that employ oxidized or, more generally, functionalized, multiwalled carbon nanotubes (ox-MWCNT) as an electrodeposition additive to enhance the rate and deposition thickness of electroplated metal-nanotube nanocomposites while simultaneously controlling their porosity. The formation of robust metal-nanotube nanocomposites constitutes a long-standing challenge as bulk processing of carbon nanotube (CNT) composites typically results in weak material properties due to (1) stress concentrations created by non-uniform CNT distribution, (2) lack of nano- and microscale structural control, (3) weak material matrices, and (4) poor inter-particle and matrix-particle interactions. Addressing these challenges would help to provide composite materials with improved strength, electrical and thermal conductivity, for example.

In the preferred embodiments, the present inventors' approach in addressing these challenges is to control the CNT surface chemistry and charge in the electrolyte to ensure good inter-particle interactions and uniform integration during electroplating, forming homogeneous nanocomposites. Specifically, CNT oxidation state, degree of protonation, and dispersion concentration are employed in order to mitigate agglomeration in the electrolyte and on the working electrode (WE) prior to integration. The impact of electrolyte composition on the microscale structure, porosity of the composite, and deposit thickness is demonstrated. Further backfilling of the pores can easily be accomplished with classical electroplating in a post-processing step or by continual deposition after the CNT additives are consumed.

CNTs are particularly attractive as electroplating additives due to their high electrical conductivity, large surface area, easily modified surface chemistry and charge allow for enhancement of deposition rates, while their impressive mechanical, electrical, and thermal properties enhance the material properties of the resulting nanocomposite. Precise incorporation of small quantities of CNTs into matrices has been shown to greatly increase the composite's strength [Chai et al (2013)] and thermal conductivity [Subramaniam et al (2014)].

Figure 1:
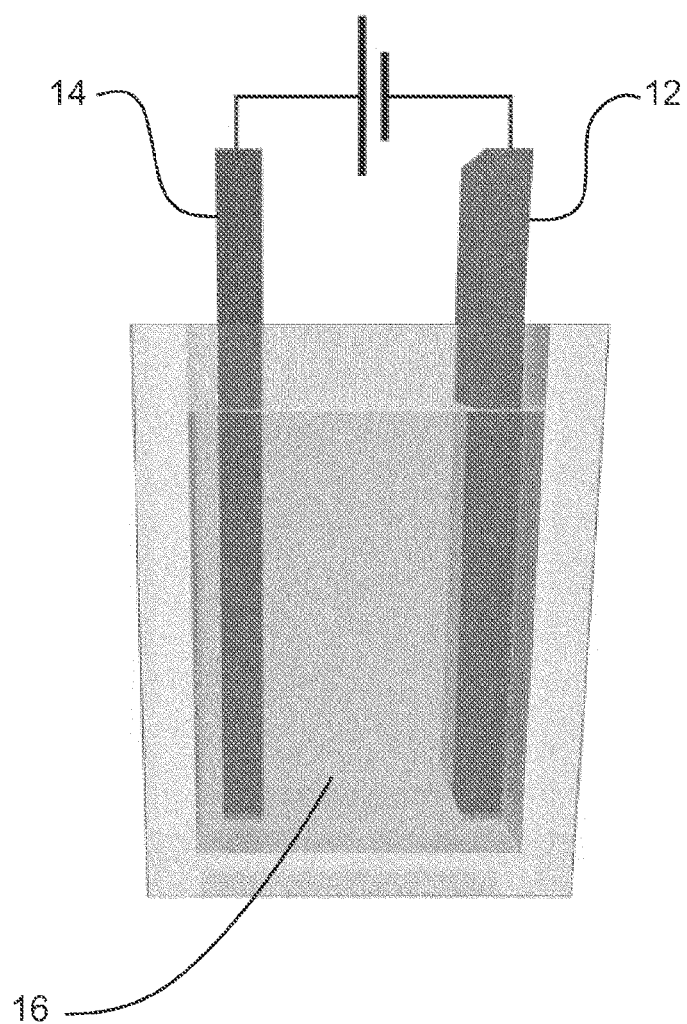
FIG. 1 illustrates a simple electrochemical cell used for CNT-copper nanocomposite deposition.
Figure 2:
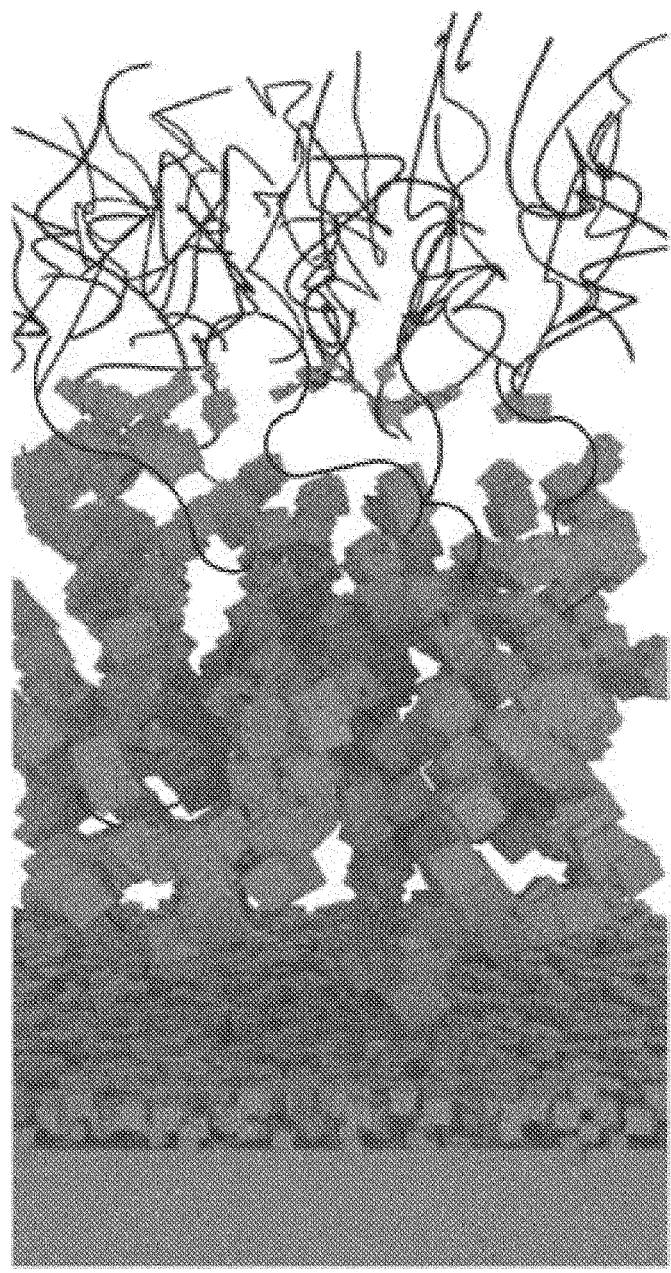
FIG. 2 illustrates a substrate initiated nucleation of Cu deposition on CNTs.
Figure 3:
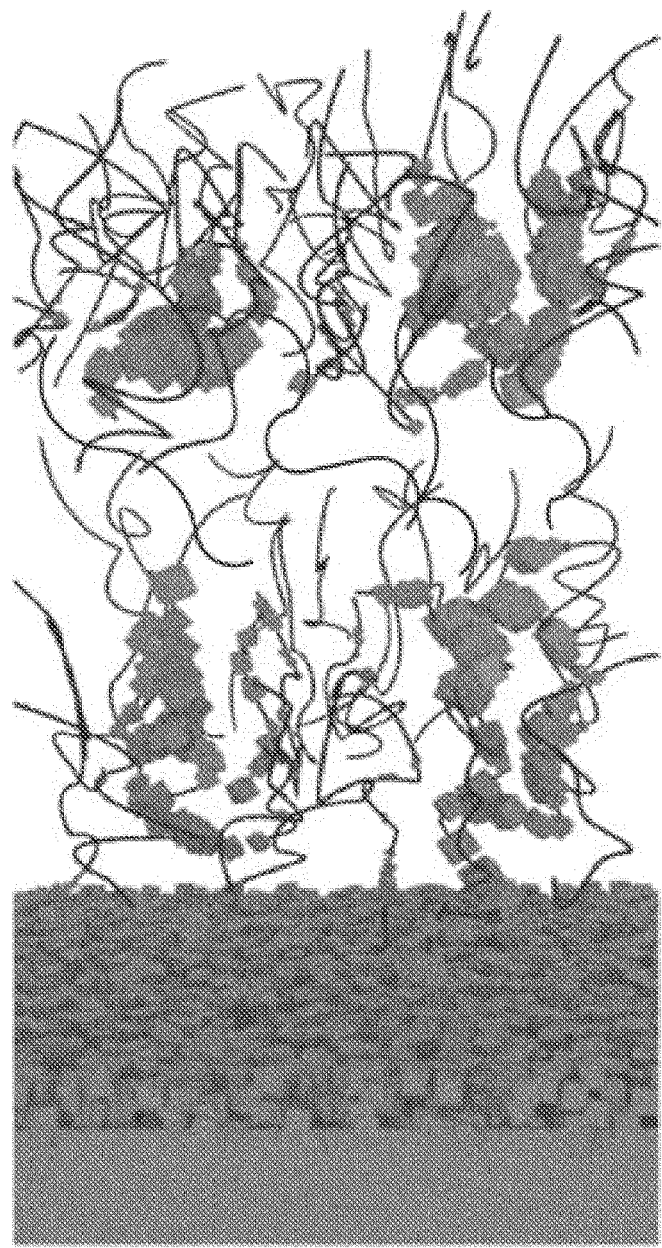
FIG. 3 illustrates spontaneous nucleation of Cu deposition on CNTs.
Figure 4:
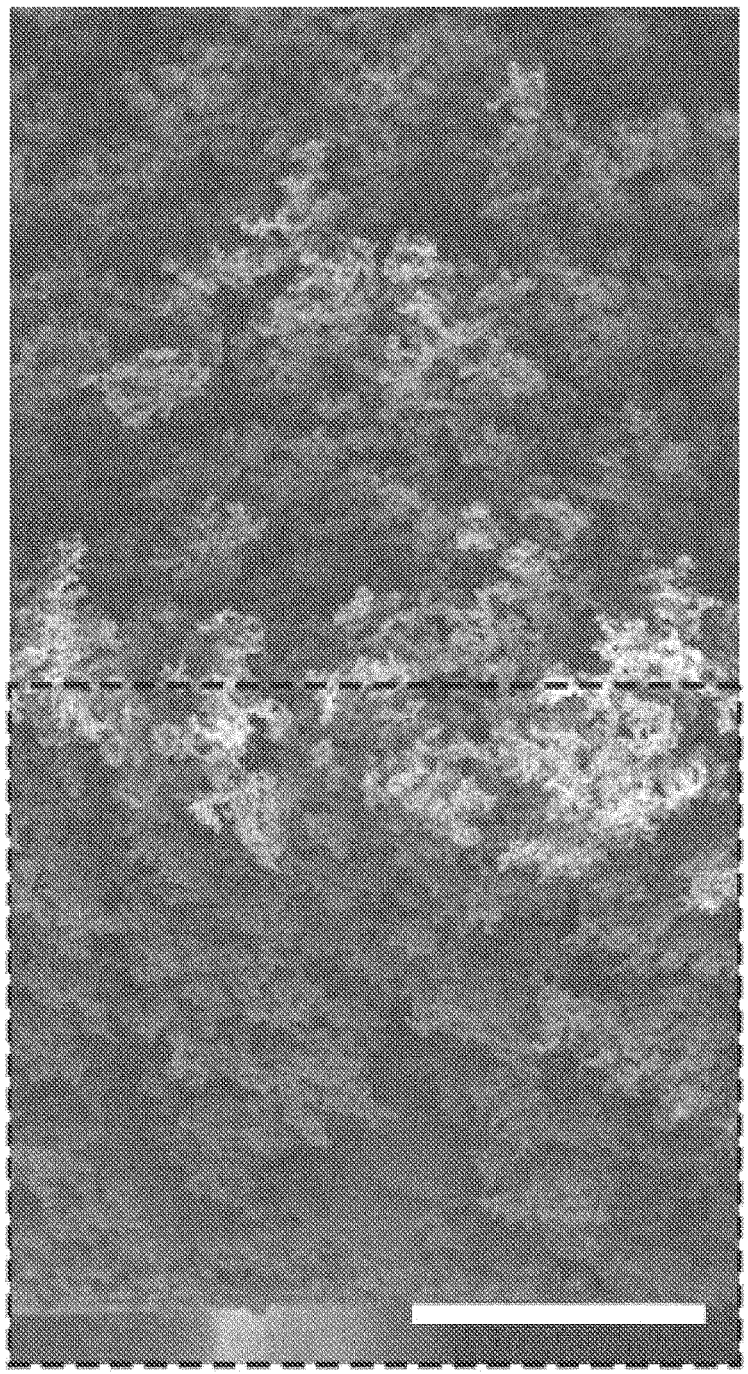
FIG. 4 shows a low magnification SEM image of the top surface and side wall of the working electrode after deposition. The scale bar represents 1 mm.
Figure 5:
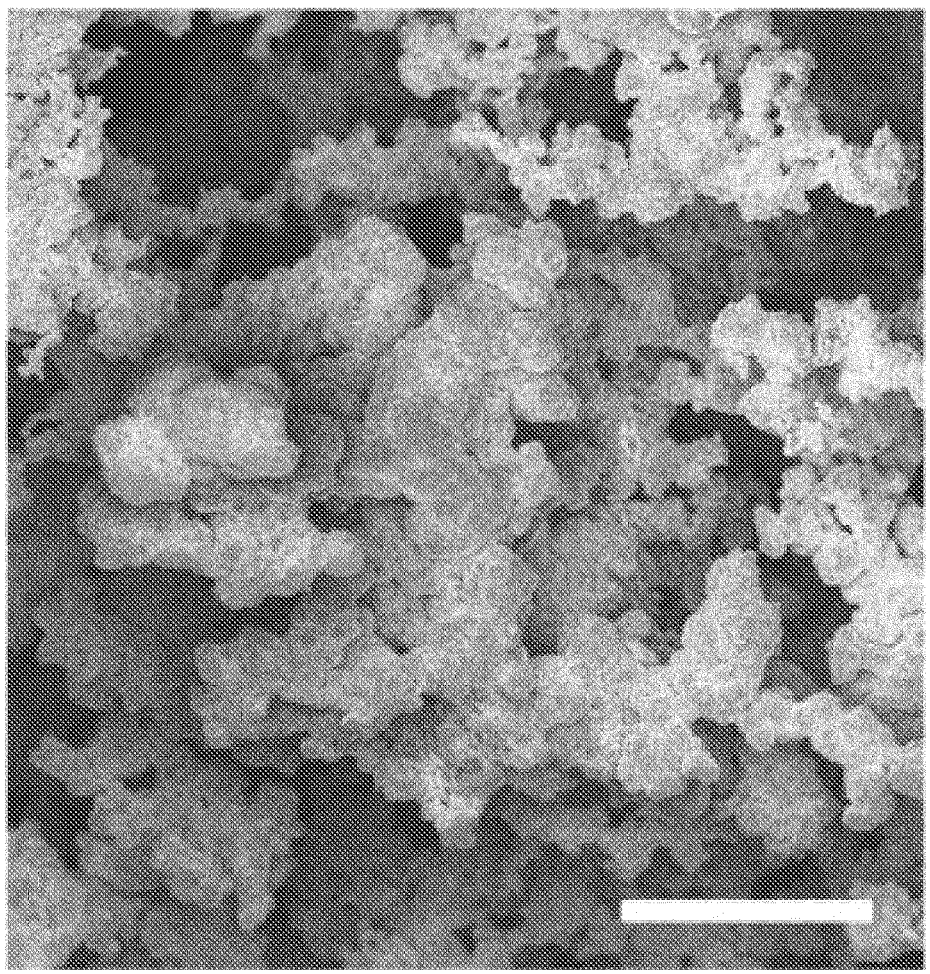
FIG. 5 shows an SEM image of the deposited layer on the side surface of the working electrode. The scale bar represents 20 μm.

In the preferred embodiments of the process of the invention, a simple electroplating setup is employed, consisting of copper working electrode 12 (WE) and counter electrode 14 (CE) in a copper sulfate and sulfuric acid electrolyte 16 with added ox-MWCNTs suspensions. This is illustrated in FIG. 1. The voltage is applied and current is measured using a potentiostat (not shown), while a side-on camera monitors the deposited layer thickness and nucleation mechanism. The camera can be used for ex situ height monitoring, and/or can be used for in situ height monitoring and/or quality control. During deposition, protonated and complexed ox-MWCNTs (ox-MWCNT that are complexed with metal ions via chelation) migrate readily and/or rapidly to the WE, where they are incorporated into the copper deposition. Those CNTs that are deprotonated or polarized will move to the closer electrode. As such, some would also move to the WE, where they would undergo a similar process. Copper nucleation in electrolytes having sulfuric acid concentrations above 0.2 M was observed to take place in a front starting from the WE, while at lower acid concentrations probabilistic nucleation also takes place directly on the nanotubes already in electrical contact with the WE. This is schematically indicated in FIGS. 2 and 3. In both cases robust 3D multiporous CNT-copper nanocomposites were deposited, as shown in FIGS. 4 and 5.

The deposited composites are found to form a 3D network with sub-micron copper crystals coating the CNTs completely and forming pores on multiple length scales. The sub-micron copper crystals grow in size during the deposition and are considered to be a key factor responsible for the slowdown in height rate. The composite surface area is further increased by the large surface roughness and microscale protrusions and overhangs of the copper deposit. This increase in surface area is now realized also to be a key factor responsible for the slowdown of the deposition. Thus, as the surface area increases during the deposition, the slowdown occurs.

The ox-MWCNTs added to the electrolyte are stabilized in the suspension due to their surface charge, which is determined by the surface density of charged groups and the acid content of the electrolyte (i.e. the pH).

The type of charged groups can be obtained from FTIR measurements. Additionally or alternatively, using quantitative EDX it is possible to obtain the atomic fractions of oxygen and other elements comprising the charged groups and estimate their surface density. The density of the surface charged groups is primarily useful in consideration of the total charge on the CNT. If there is no charge or the CNT is negatively charged it will not migrate to the WE and instead may even migrate to the CE. If the CNTs have no charge in the electrolyte they will still undergo polarization in the electric field and those closer to the WE will migrate to it. Qualitatively, CNTs that are more oxidized accelerate the deposition.

No agglomeration is observed in electrolyte mixtures without sulfuric acid at any time during the deposition, in the compositions tested in this work. Nanocomposites deposited using these electrolyte mixtures exhibit up to an order of magnitude increase or more in deposited layer thickness as compared to pure copper electroplating. Observable agglomerates form in electrolytes containing 0.2 M sulfuric acid concentrations within the first few minutes of deposition. These are mostly translucent and are observed to deform readily as they migrate to the WE. During deposition the number of particles decreases steadily as CNTs are incorporated into the copper deposition, while their size remains largely unaffected. For electrolytes with higher acid content (>0.4 M $H_2SO_4$) the nanotubes readily agglomerate, forming particles on the order of tens of microns that persist throughout the deposition process. Both the particle size and opacity increase with increasing acid concentrations.

Electrodeposition heights, rates, and areal densities are shown in FIGS. 6-11 for CNT-Cu composites and pure copper (control samples) deposited using direct current (DC) in electrolytes with increasing acidity.

The deposition height was obtained from side-on videos by tracking the edge of the deposited layer using FIJI These curves were filtered using a digital low-pass Butterworth filter and then differentiated to obtain the height deposition rate, while the areal densities were obtained using the measured current during deposition and the electrode surface area.

Figure 6:
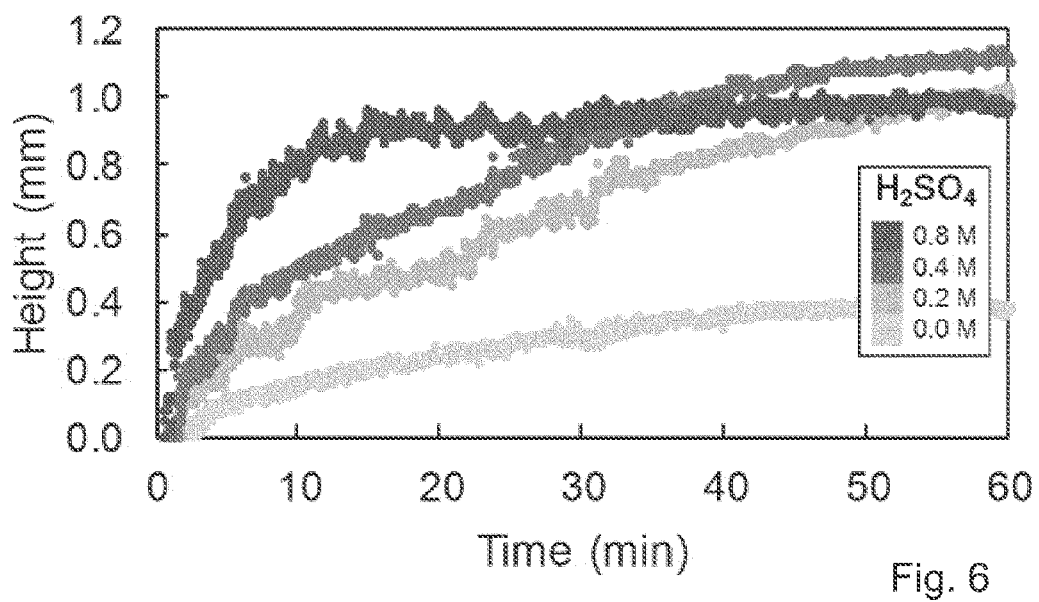
FIG. 6 shows the effect of adding a small quantity of CNTs to the electrolyte (<0.01 wt. %) on the electrodeposited (DC) layer height of copper nanocomposites, varying with $H_2SO_4$ concentration.
Figure 7:
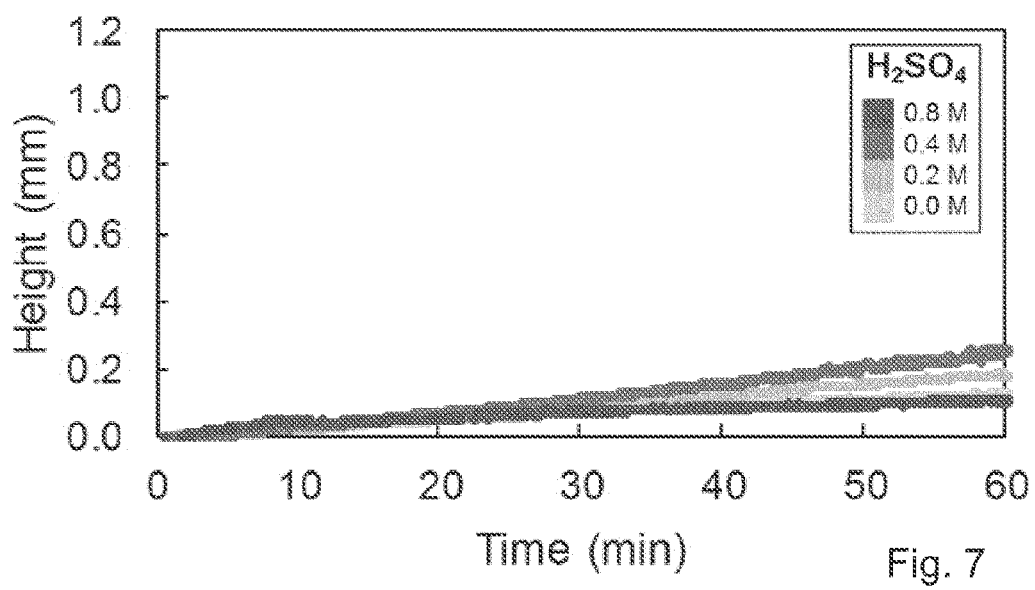
FIG. 7 provides control data for FIG. 6, no CNTs being added.

The data shows that the deposited height of CNT-Cu composites can be increased significantly, in comparison to pure copper deposition, by the addition of small quantities of CNTs to the electrolyte (<0.01 wt. %) during DC electrodeposition (FIGS. 6 and 7). The height of electroplated copper layers increases with increasing sulfuric acid concentrations up to 0.4 M and remains largely linear during the deposition. However, copper plating in electrolytes with 0.8 M exhibits a large height increase within the first 10 min and remains constant throughout the deposition, resulting in the thinnest film (<110 μm after 60 min). The thickest copper film is deposited in 0.4 M sulfuric acid and reaches 255 μm after 60 min. Addition of CNTs causes significant nonlinearities in the height deposition and produces significantly higher deposition heights, An increase in sulfuric acid concentration, up to 0.4 M, increases the deposited height, reaching 1.1 mm after 60 min. However, nanocomposites deposited in electrolytes with 0.8 M sulfuric acid exhibit comparable heights to those deposited with 0.2 and 0.4 M. Furthermore, 0.8 M sulfuric acid concentrations produce the largest deposition heights in the first 30 min. They reach an impressive height of 570 μm in the first 5 min and over 800 μm in 10 min.

Figure 8:
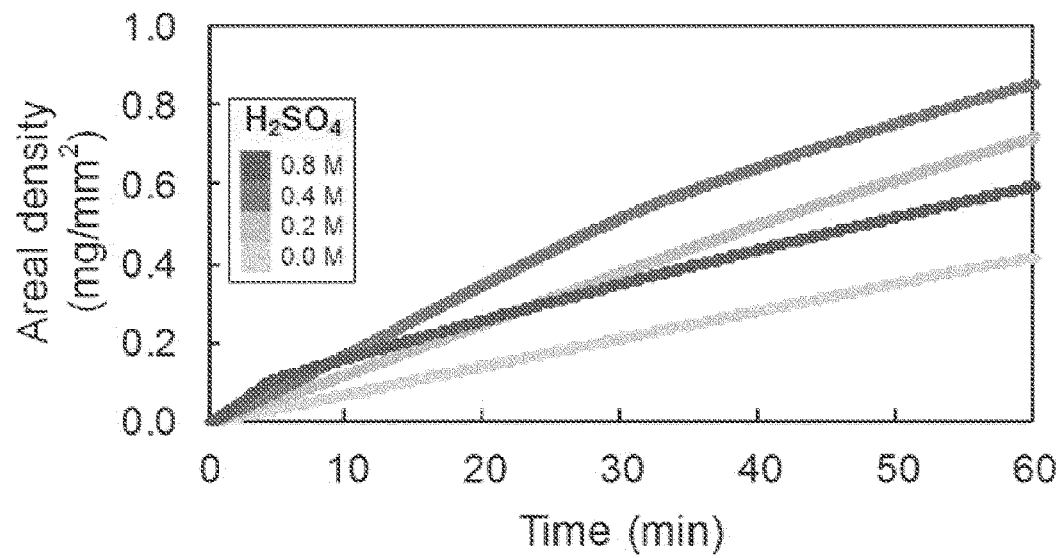
FIG. 8 shows the areal density (mass per unit area) of the deposited layer, for the Cu-CNT composite layer.
Figure 9:
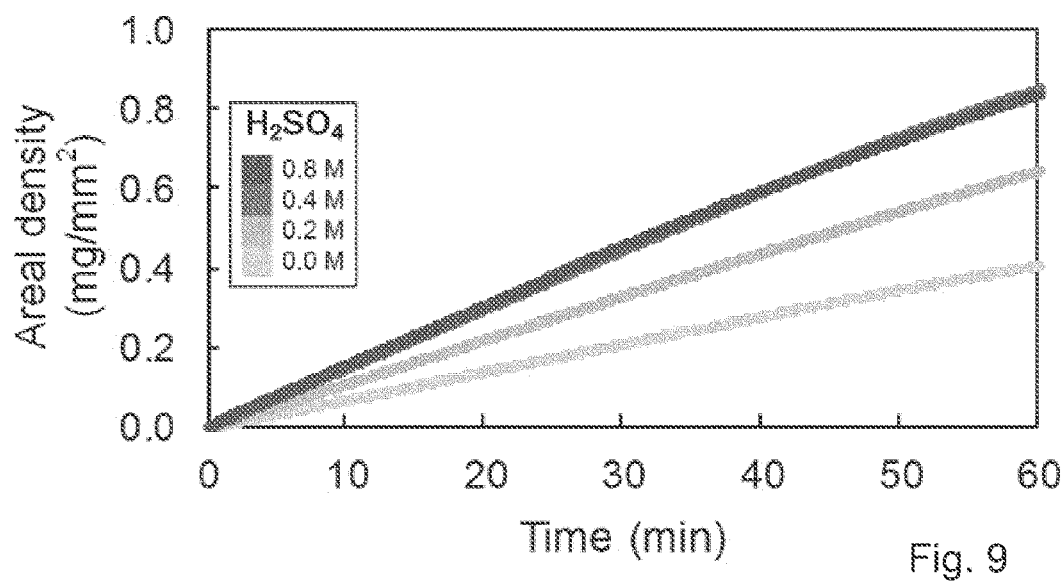
FIG. 9 provides control data for FIG. 8, no CNTs being added.
Figure 10:
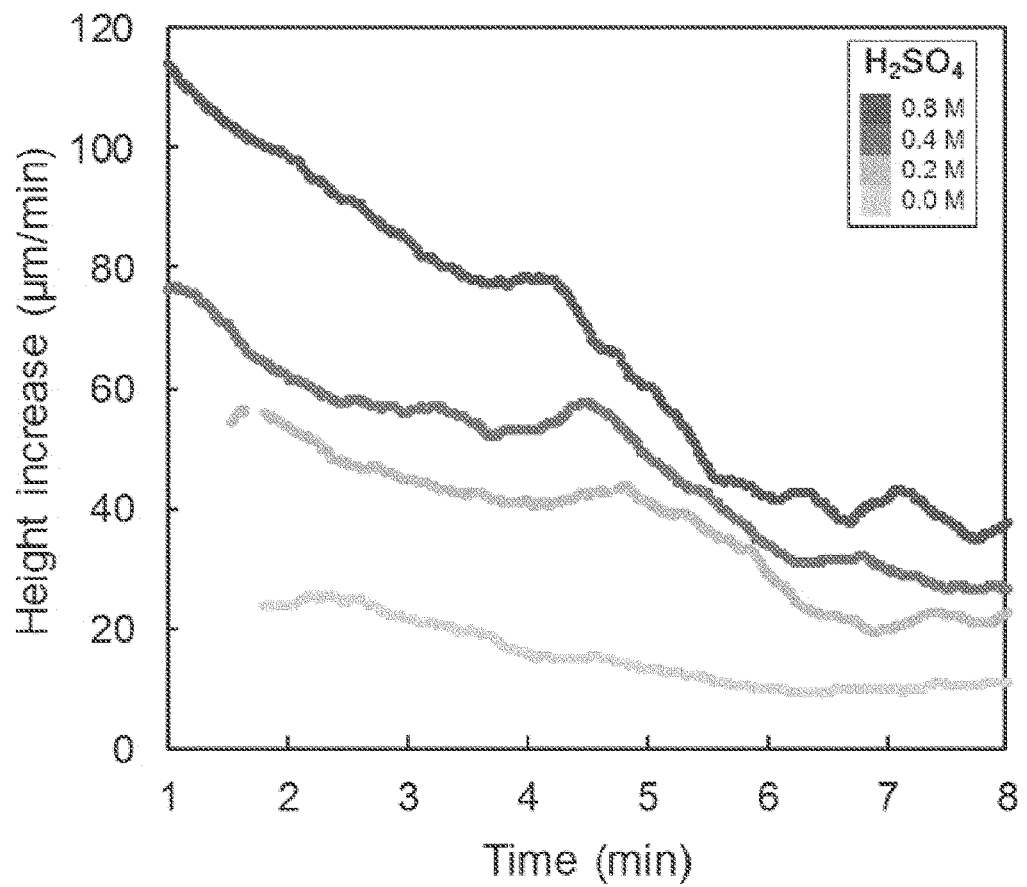
FIG. 10 shows the effect of $H_2SO_4$ concentration on the height increase rate for the deposition of Cu-CNT composite layers.

The areal densities of nanocomposites and pure copper samples with sulfuric acid concentrations up to 0.4 M are comparable, suggesting that the addition of CNTs does not increase the electrodeposited mass (FIGS. 8 and 9). Nanocomposites deposited in 0.8 M sulfuric acid have the largest areal density at 4 min. However, a reduced linear deposition rate is rapidly established thereafter, leading to a smaller areal density than a comparable copper sample. This results in the sample with the largest porosity due to the low areal density and large sample height.

The rate of height deposition was obtained by differentiation of height curves (FIG. 10), which were filtered using a digital Butterworth low pass filter with lag compensation. Despite the filtering the data prior to 1 min is unreliable, due to large noise. The largest increase in height using DC electrodeposition was obtained in electrolytes with 0.8 M sulfuric acid and exceeds 110 µm/min at 1 min. However, this rate rapidly drops off, due to depletion of CNTs from the electrolyte and increasing copper surface area. Nanotubes were not replenished during deposition, leading to a decrease in concentration and ultimately termination of the nanocomposite deposition. Continued plating after CNTs are consumed decreases the porosity of the composite by backfilling the structure.

Figure 11:
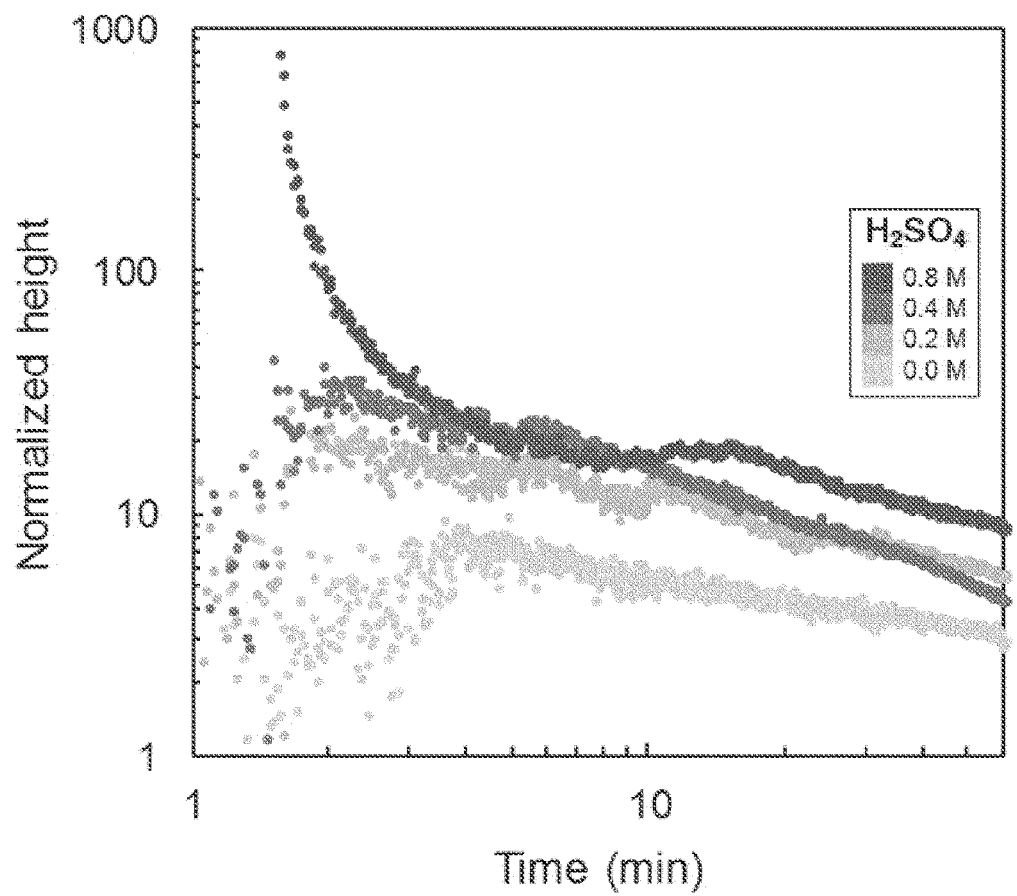
FIG. 11 compares the height change for the deposition of Cu-CNT composite layers with Cu layers at different $H_2SO_4$ concentration.

Dividing the nanocomposite height by the height of copper films deposited using the same electrolyte produces a normalized height showcasing the relative improvement in deposition (FIG. 11). Up to an order of magnitude increase in deposition height is obtained by adding CNTs to electrolytes without any sulfuric acid, while a 30 times increase in height is shown for electrolytes with DAM sulfuric acid at 10 min. An increase of a few hundred times in deposited height is facilitated by adding CNTs to electrolytes with 0.8 M sulfuric acid concentrations in the first few minutes of deposition. The fundamentally different curve for high acidity electrolytes suggest a different integration mechanism or plating rate.

Figure 12:
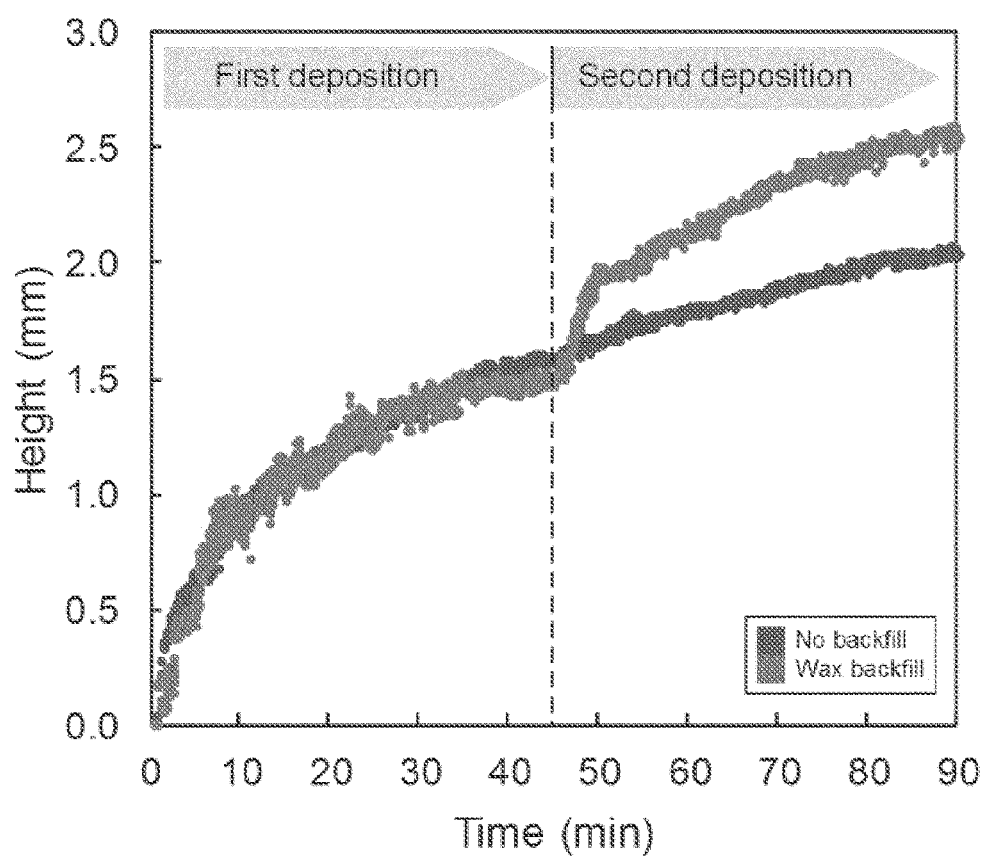
FIG. 12 shows that further increases in deposition rate and height are achievable using pulsed electrodeposition (FED) at high acid concentrations (0.8 M $H_2SO_4$).

The height and height deposition rate of CNT-Cu nanocomposites can be further increased using sequential deposition and pulsed electrical deposition (PED) techniques, where deposition is periodically interrupted by setting the voltage across the electrodes to zero. Reverse-pulse electrodeposition techniques are also suitable. Sequential PED experiments were conducted by replacing the electrolyte, CNTs, and CE in an effort to maintain the large initial deposition rates (see FIGS. 12-14). Although large initial deposition rates are not maintained in these results, a linear deposition rate can be obtained after 40 min and results in deposited films exceeding 1.7 mm in 60 minutes (2.0 mm at 90 min). This indicates that the reduction of CNT concentration during the later stages of deposition is not a factor responsible for the reduction in height growth rate during PED. Backfilling the highly porous nanocomposite between depositions with paraffin wax, has produced large initial deposition rates for the second deposition (FIG. 12). This suggests that the total nanocomposite surface area increase is the main cause of decreased deposition height after the first 10 min. During deposition the relative size of the WE increases significantly in relation to the CE and the disassociation of the CE becomes the rate limiting step. Therefore in some embodiments it is advantageous to use a CE with substantially larger area in order to promote the growth rate (in terms of height increase rate and areal density increase rate).

Figure 13:
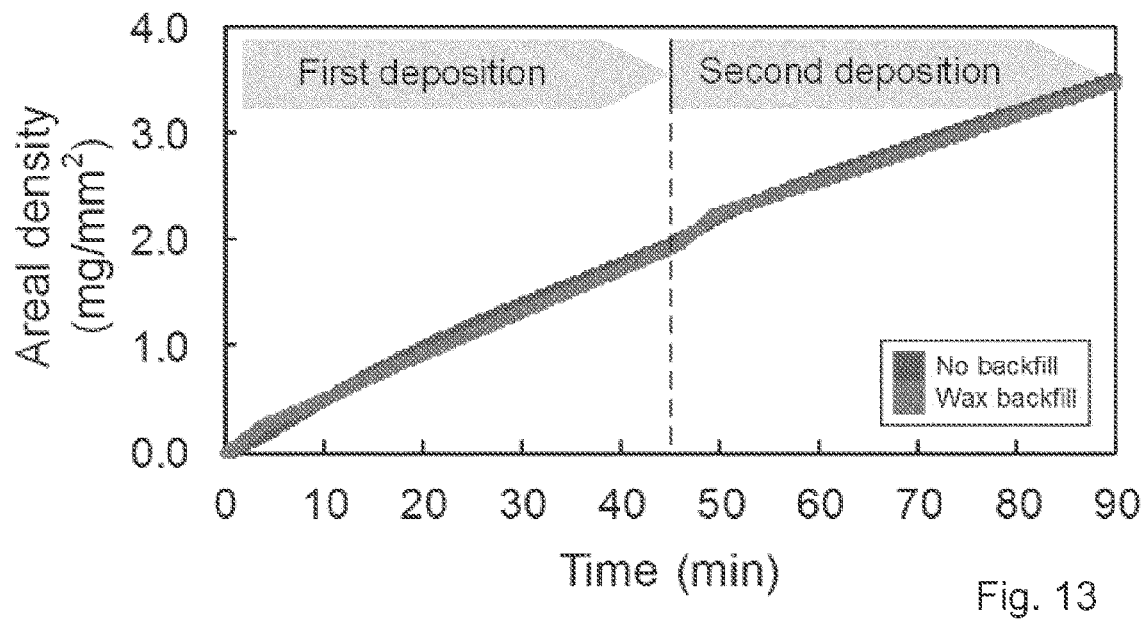
FIG. 13 shows that FED significantly increases the deposited areal density as compared to DC deposition, and that the mass deposition rate is not significantly impacted by ex situ wax backfilling.
Figure 14:
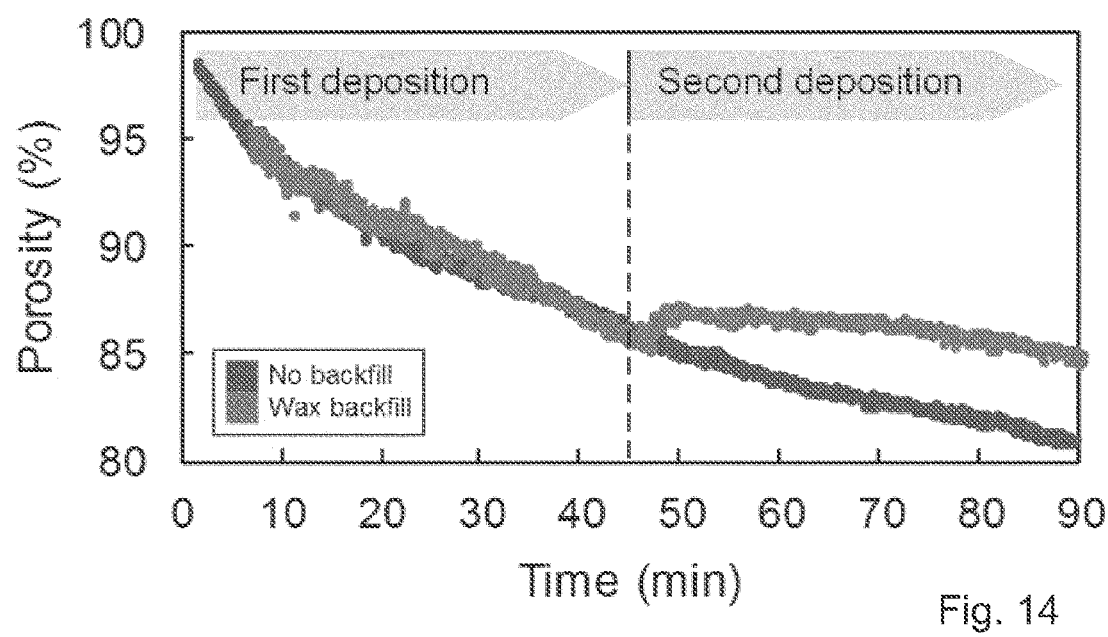
FIG. 14 shows the change in porosity of the deposited layer of FIG. 13 with time.
Figure 15:
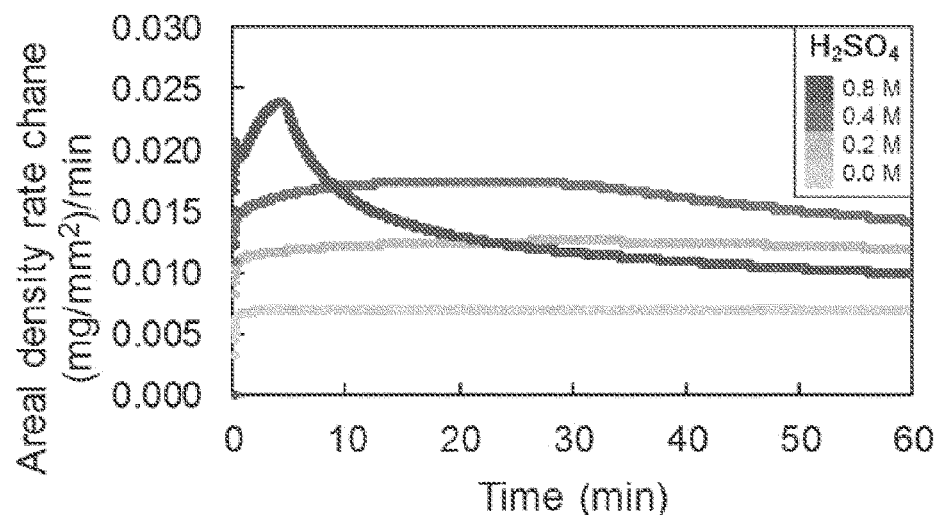
FIG. 15 shows the rate of change of area density when growing a CNT-Cu composite layer according to an embodiment of the invention. It is considered that this rate of change is proportional to the current density ($A/cm^2$) applied during the deposition, which is limited by the power supply, counter electrode area, and the electrolyte breakdown. The units of $mg/mm^2/min$ correspond numerically to the units of $kg/m^2/min$.
Figure 16:
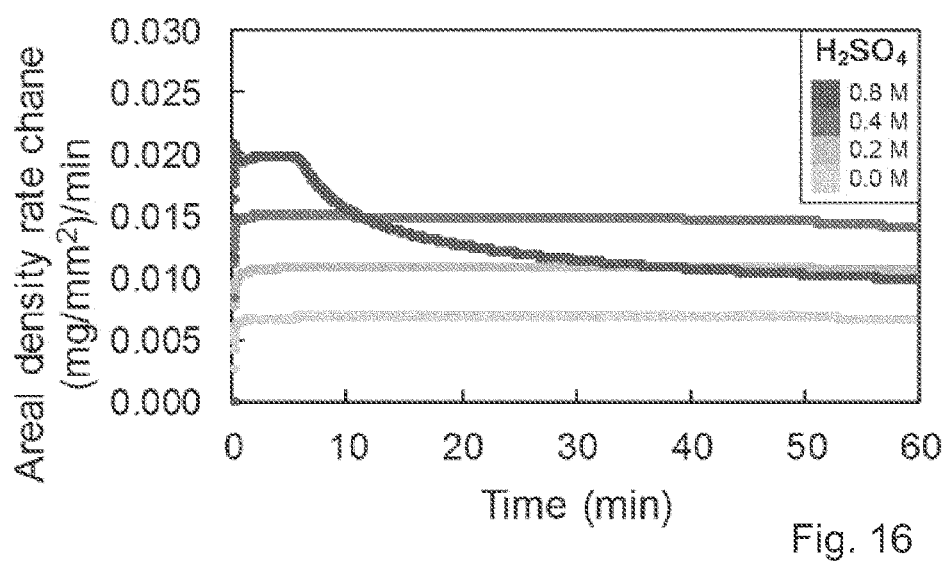
FIG. 16 shows the rate of change of area density when growing a Cu layer, without CNTs, for comparison with FIG. 15, the other conditions being the same.

The areal density increases steadily from the first to the second deposition, regardless of backfilling (FIG. 13). The areal density of the composite increases during deposition as the 3D framework is continually grown and backfilled. Initial density measurements for PED produced CNT-Cu nanocomposites are as low as 0.127 g/cm$^3$ (98.6% porosity) for 350 µm thick films, while densities can reach up to 1.699 g/cm$^3$ (81.0% porosity) for 2 mm thick layers at the end of the deposition. The initial large porosity is indicative of discontinuous or extremely rough initial deposition layers. As expected, the porosity of sequential deposition on backfilled composites increases rapidly during the large initial deposition rates of the second deposition (FIG. 14).

For structural applications, backfilling of the porous network can be used to either uniformly fill the structure, to further enhance the multiporous nature of the material, or impart new properties, such as electrical storage capacity. For example, thermally conductive multiporous networks are desirable in heat transfer applications, such as heat exchangers, heat pipes, and vapor chambers. Alternatively, this process can be developed into an additive manufacturing (AM) process, where a framework is sequentially deposited and subsequently backfilled. The backfilling is then essentially an electroforming process, with the resultant product an electroformed product.

When using the present invention for an electroforming process, the composite material described above can be first formed and considered to be a scaffold material. The scaffold material is then removed from the WE (if necessary) and used as the starting point (substrate) for a standard electroplating process. This electroplating process achieves a reduction in porosity, by plating into the porosity and filling the porosity. The benefits of doing this is that the time to create the electroformed product is significantly reduced compared with known electroforming methods, and better material properties (mechanical, thermal, for example) can be achieved.

The inventors have considered possible mechanisms for the initial growth and subsequent backfilling to fill the porosity. This is relatively speculative, but is provided in order to give some suitable explanations of the phenomena reported in this disclosure.

Based on literature and on the observations by the inventors, it is considered that oxidized MWCNTs in the electrolyte undergo complexing with the metal ions (via chelation) and charge polarization (due to the electric field between the electrodes). This results in charge separation in individual CNTs and a slight positive charge due to the complexing with metal ions. The CNTs then migrate to the WE (charge attraction) and may align somewhat to the field due to polarization. Upon contacting the WE the charges in the CNT equilibrate with the electrode. However, due to the high aspect ratio of the CNTs a field enhancement effect likely takes place (calculated to be up to 80 times larger than average field for individual tubes), which attracts subsequent CNTs much more than the field of the flat WE electrode. Over time CNTs from the electrolyte make contact with the tips of the CNTs already in contact with the electrode (these may be partially or completely coated with copper), creating "foams" with larger pores then the length of any individual CNT, This speculative explanation also applies to CNT agglomerates.

It is of interest to estimate how the work presented here compared with the height rate change and area density rate change when forming CNT-metal composite layers in the prior art.

The inventors' estimations of the height rate change and area density rate change for selected prior art documents and the preferred embodiments of the present invention are summarized in Table 1.

TABLE 1

| Authors | Height rate change (µm/min) | Area density rate change (mg/mm$^2$)/min | Current density (A/cm$^2$) |
|---|---|---|---|
| Arai et al. (2004) | 0.256 | 1.98E−03 | 1.00E−02 |
| Chai et al. (2008) | 0.217 | 1.98E−03 | 1.00E−02 |
| Lee et al. (2011) | 0.110 | 2.69E−09 | — |
| Manu et al. (2013) | 0.536 | 4.94E−04 | 2.50E−02 |
| Present work | 120 | 2.40E−02 | 1.20E−02 |

FIGS. 21-23 demonstrate a series of SEM images showing that the morphology of the deposited layer is affected by the current density. The deposited layer of FIG. 21 was deposited using a current density of −3.7 mA/mm². The deposited layer of FIG. 22 was deposited using a current density of −2.6 mA/mm². The deposited layer of FIG. 23 was deposited using a current density of −1.8 mA/mm². It is therefore seen that the morphology of the deposited layers can be significantly impacted by the current density used during deposition.

The inventors have therefore demonstrated a promising process capable of sequential deposition with large height deposition rates. In general, AM encompasses a set of emerging processes that sequentially add material to create complex objects from the bottom-up. Such processes enable greater freedom in component design, reduced fabrication cost, shortened supply chains, increased energy efficiency and lowered environmental impact. However, industrial use of AM is currently limited to mass product customization (e.g. dental implants, hearing aids, joint replacement) and technically demanding fluid applications (e.g. nozzles, turbine blades, complex heat exchangers). Metal AM is a particularly attractive process due to the strength of the produced parts, but it is also the most challenging to implement industrially at scale. Commercial metal AM technologies primarily rely on localized powder sintering via application of heat or wire melt and localized re-solidification to produce parts. However, metal powder sintering is slow and suffers from large material stresses, local voids, high surface roughness, and low wear resistance, while wire melt technologies on the other hand suffer from low accuracy and poor reproducibility.

It is considered that a porous composite layer of carbon nanotubes and metal has particular utility in thermal management applications. For example, the composite layer can be used in a vapour chamber and/or in a heat pipe. A technical discussion of the factors affecting the thermal performance of a heat pipe has already been set out in Manimaran et al (2012), the entire content of which is hereby incorporated by reference. Similar considerations apply to a vapour chamber. More generally, such apparatus can be considered to be evaporation-condensation apparatus for the transfer of heat. Such an apparatus comprises a closed container having an evaporator region and a condenser region. The container has a wicking layer formed on an internal surface of the container and a working fluid contained in the container. In embodiments of the invention, the wicking layer comprises a composite layer of carbon nanotubes and metal according to an embodiment of the invention. Evaporation of the working fluid at the evaporator region, the mass transport of the evaporated working fluid from the evaporator region to the condenser region and the condensation of the working fluid at the condenser region contributes to the transfer of heat. The condensed working fluid is transported back to the evaporator region along the wicking layer. The formation of the wicking layer can be carried in situ on the container by the electrodeposition techniques disclosed herein.

Figure 19:
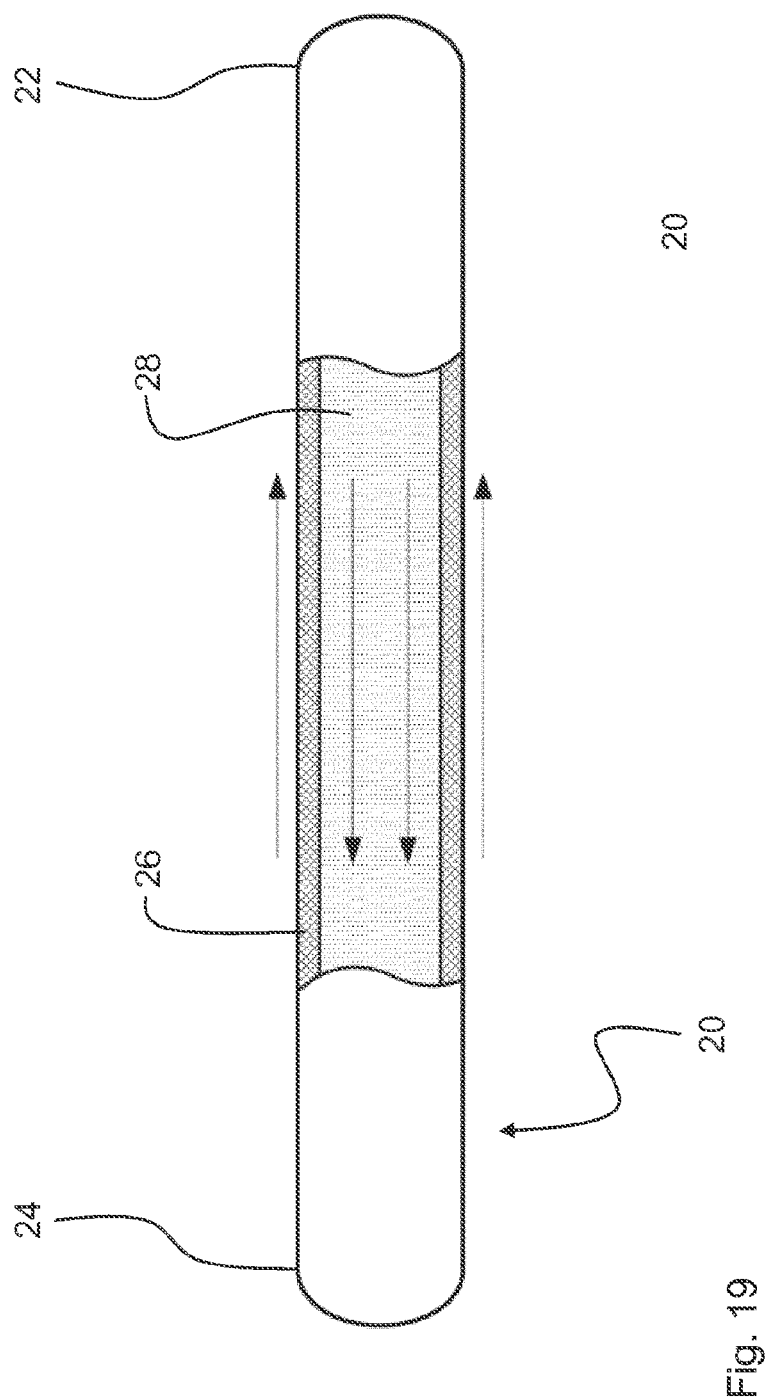
FIG. 19 shows a schematic partial cross sectional view of a heat pipe according to an embodiment of the invention.

In one embodiment, as shown in FIG. 19, there is provided a heat pipe 20. Heat pipe 20 has the form of an elongate closed container having an evaporator region 22 and a condenser region 24. The container has a wicking layer 26 formed on an internal surface of the container and a working fluid 28 contained in the container. The wicking layer comprises a composite layer of carbon nanotubes and metal according to an embodiment of the invention, as described above. This can be formed conveniently on the interior surface of a copper pipe by the methods described above, and the pipe then filled with the working fluid and sealed. Evaporation of the working fluid 28 at the evaporator region 22, the mass transport of the evaporated working fluid from the evaporator region 22 to the condenser region 24 and the condensation of the working fluid at the condenser region 24 contributes to the transfer of heat. The condensed working fluid is transported back to the evaporator region 22 along the wicking layer 26. The mass transport of working fluid is indicated in FIG. 19 by the straight arrows.

Figure 20:
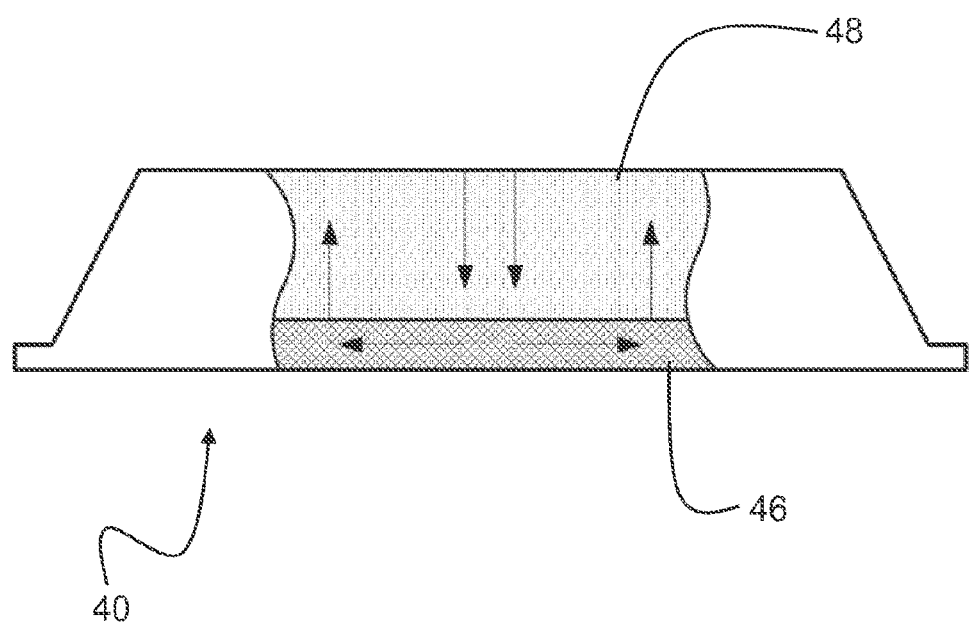
FIG. 20 shows a schematic partial cross sectional view of a vapour chamber according to an embodiment of the invention.

In one embodiment, as shown in FIG. 20, there is provided a vapour chamber 40. Vapour chamber 40 a wicking layer 46 is formed on an internal surface of the vapour chamber and a working fluid 48 is contained in the vapour chamber. The wicking layer 46 comprises a composite layer of carbon nanotubes and metal according to an embodiment of the invention, as described above. This can be formed conveniently on a copper plate by the methods described above, and the vapour chamber formed by fitting a suitable cover piece over the plate, the space in the vapour chamber being filled with the working fluid and sealed. The vapour chamber is placed in contact with a heat source (typically a component that requires cooling). Liquid working fluid is vaporised and the vaporised working fluid convects through the vapour chamber. The working fluid condenses on cold surfaces of the vapour chamber and are collected in the wicking layer. The condensed working fluid wicks towards the coolest area of the vapour chamber available. The effect of this is that the vapour chamber acts effectively as a heat spreader. Again, in FIG. 20, the mass transport of working fluid is indicated by the straight arrows.

The layer may be deposited on-any suitable substrate. For example, the substrate may be formed of wire. Furthermore, the substrate may be in the form of a mesh, such as a wire mesh. Such wire or mesh may be subjected to deposition as disclosed here, and then incorporated into a thermal management device which as a heat pipe or vapour chamber.

FIGS. 24-27 help to illustrate the technical advantages provided by the present disclosure. FIG. 24 shows a relatively low magnification SEM image of a partial cross section through a heat pipe with a commercial sintered Cu powder coating layer, whereas FIG. 25 shows an enlarged view of the area indicated in FIG. 24 using a white dashed line box. As can be seen here, the sintered Cu powder coating layer has relatively low porosity. FIG. 26 shows a relatively low magnification SEM image of a partial cross section through a heat pipe according to an embodiment of the invention with a highly porous Cu-CNT deposited layer. FIG. 27 shows an enlarged view of the area indicated in FIG. 26 using a white dashed line box. As can be seen in FIG. 27, the deposited layer has high porosity, making it particularly well-suited to the disclosed thermal management applications. In the embodiment shown in FIGS. 26 and 27, the layer is formed at an initial current density of −4.3 mA/mm². This helps to initiate the foam-type structure. Subsequently, the current density may be reduced, e.g. to about −2.6 mA/mm² or lower to consolidate the growing deposited layer.

The embodiments of the present invention discussed above provide high porosity composite layers which are formed from highly conductive materials (copper and CNTs) and have a large surface area in relation to the footprint area. (That is, for a composite layer having a particular footprint area (or plan view area), the actual surface area provided by the composite layer is substantially greater than the footprint area.) These features combine to provide a number of specific benefits when the material is used as a current collector, such as in batteries, supercapacitors, and fuel cells. These are explained below.

The large current collector surface area provides increased contact area for active materials, which lowers the internal device resistance and allows for increased efficiency and larger current rates during operation.

For active materials that are to be applied in thin coatings (low conductivity materials such as metal oxides in some batteries), a larger current collector surface area allows for more of the active material to be used, increasing the capacity of the device.

The thickness of a current collector using the material of the preferred embodiments of the present invention can be easily increased beyond what is currently possible using known techniques, in order to further increase the battery or supercapacitor capacity.

A highly porous current collector allows for good access of the electrolyte, reactants, and products to and from the active material, significantly increasing the power rates at which the device can safely operate.

Considering known approaches to the use of electrodeposition for forming current collectors, Taberna et al. (2006) use a very expensive, consumable template to slowly electrodeposit copper nanopillars on a flat copper electrode to be used as a current collector. They have shown a factor of 6 improvement in power density due to the current collector geometry as compared to flat current collectors. Using the preferred embodiments of the present invention, it is possible to deposit a significantly thicker layer with higher porosity and a larger surface area, which therefore has significantly improved performance characteristics as a current collector compared with the performance shown in Taberna et al. (2006), and which can be formed more efficiently.

Experimental Details

Oxidized CNT suspension preparation: industrial grade MWCNTs (Nanocyl, NC7000, 100 mg) were placed in nitric acid (Sigma-Aldrich, 70%, 20 mL) and oxidized in a microwave reaction system (Anton Paar, Multiwave PRO). The mixture was vigorously stirred and heated to 175° C. in 10 min, kept at constant conditions for 30 min, and cooled to room temperature. The resultant oxidized CNT dispersion was then diluted with 200 mL of DI and repeatedly washed, before drying at 80° C. overnight. A bath sonicator (Elma, 320 W for 6 h) was used to redisperse 110 mg of oxidized CNTs in 50 mL of DI. After overnight decanting, the supernatant was recovered. The concentration of the solution was measured via TGA analysis and diluted to 0.1 wt %.

Copper electrode and electrolyte preparation: Copper sheets (Onecall, 0.635 mm nom. thickness) were sheared and cleaned by soaking in hydrochloric acid (Sigma-Aldrich) for 5 minutes. After washing with DI, the copper sheets were stored in an argon environment. Several electrolyte solutions were prepared with 0.8 M copper sulfate (Sigma-Aldrich) and sulfuric acid (Sigma-Aldrich) concentrations ranging from 0 M to 1.0 M.

Electroplating: The cleaned copper sheets were placed 1 cm apart in an acid resistant cuvette (BrandTech, 759170). Next, 1 mL of the electrolyte and 10 µL of the 0.1 wt % oxidized CNT suspension were added to the cuvette and thoroughly mixed. The electroplating cell was then completed by connecting the copper electrodes to a potentiostat (BioLogic, VMP3). Typically, −1 V was applied between the electrodes for up to 90 min, while a camera collected videos of the deposited layer buildup. Between sequential depositions the counter electrode and electrolyte were replaced. In cases where pulsed electrodeposition was performed, the voltage was set to −1V for the active part of the cycle and set to 0 V for 10 ms to 5 s. The duty cycle used (proportion of the cycle at −1V) was up to 90% (i.e. corresponding proportion of cycle at 0V was up to 10%). Wax backfilling of select deposited layers was achieved by dipping the electrode in molten paraffin wax (Sigma-Aldrich, 53-57° C.) and allowing the molten excess to runoff before solidification.

In a modification of this process, it is possible to use electroplating solutions with lower CNT concentrations. Furthermore, the deposition voltage may be reduced (in magnitude) from −1V to less than −1V, for example to as low as −0.6V. The current density used during deposition may also be reduced. The effect of this is found to be a reduction in the porosity of the deposited layer, and hence a higher density for the deposited layer. It is found that with this approach a density ratio range of 0.380 to 0.709 is possible.

Data collection and processing: The thickness of the deposited layers was measured from the collected videos on a per frame basis by finding the edges in the image and tracking particles along that edge (FIJI, TrackMate plugin). The particle traces were then averaged prior to plotting deposition thicknesses, while the deposited height per minute was calculated by differentiation of traces that were smoothed using a digital low-pass filter (Butterworth) coded in MATLAB. The SEM images were collected using a LEO GEMINI 1530VP.

Determining the volume fraction of CNTs in the material: The CNT weight content is determined by subtracting the deposited copper mass (as calculated from the total charge transferred during deposition) from the total deposited mass or by using the carbon atomic content percentage (measured via EDX). Knowledge of the CNT density is then necessary (which can be based on a measurement of the average CNT diameter and number of walls). These factors are then used to determine the volume fraction of CNTs in the deposited composite material. Alternatively, where the volume fraction of CNTs in the material is to be determined without knowledge of the deposition conditions, the porosity of the composite material can be determined as explained below, the volume of the composite material determined (excluding the porosity) and the mass % of metal and CNTs determined by selectively removing the metal by etching. Knowledge of the density of the metal and of the CNTs (as explained above) is then used to determine the volume fraction of CNTs in the composite material. As a further alternative, quantitative EDX can be used.

The CNT-Cu composites of the present embodiments comprise 1.5-4.5 wt. % (9.5-24.5 v/v %) CNTs. These can be further electroplated (electroformed) to produce completely solid parts (0% porosity) the minimum CNT content would be reduced to 0.075 wt. % (0.48 v/v %). In order to increase the volume fraction of CNTs, e.g. to reach 10 wt. % (43.4 v/v %), the copper can be back-etched. It is suggested here that the likely limit for the content of CNTs would be about 20 wt. % (63.3 v/v %) in the as-deposited composite layers—beyond this limit it is considered that the deposition speed and the morphology would be significantly compromised. At this level, after complete backfilling of the structure, the CNT content would be about 1 wt. % (3.16 v/v %).

Determining the degree of functionalisation of CNTs: Within literature it is generally accepted that the weight fraction of functional groups can be obtained from TGA measurements. In the case of the preferred embodiments it was found that this value was between 7 and 10 wt. %. It is in theory possible to calculate the number of functional groups per unit area on the CNT surface or to calculate the fraction of functionalized C atoms on the CNT surface. However, this requires a large number of assumptions, including assumption of the number of walls in the CNT, minimum number of carbons in each wall, and the identity of the functional groups (e.g. OH and COOH, from FTIR spectra). These assumptions have a substantial effect on the outcome of the calculations. For this reason, in the present work, it is preferred to express the degree of functionalization of the CNTs in terms of the weight fraction of functional groups that is found by TGA measurement. The purpose of functionalization is to assist in dispersing the CNTs in the electrolyte. Additionally, the functionalization provides a means for the CNTs to carry a (positive) charge or to complex with the metal ions to gain a (positive) charge, allowing migration to the WE. At the WE, the CNTs may be engulfed by the growing composite layer CNT and/or may nucleate the metal (if complexing takes place, although the inventors' understanding at the time of writing is that complexation may not be required for nucleation of metal on CNTs).

Figure 17:
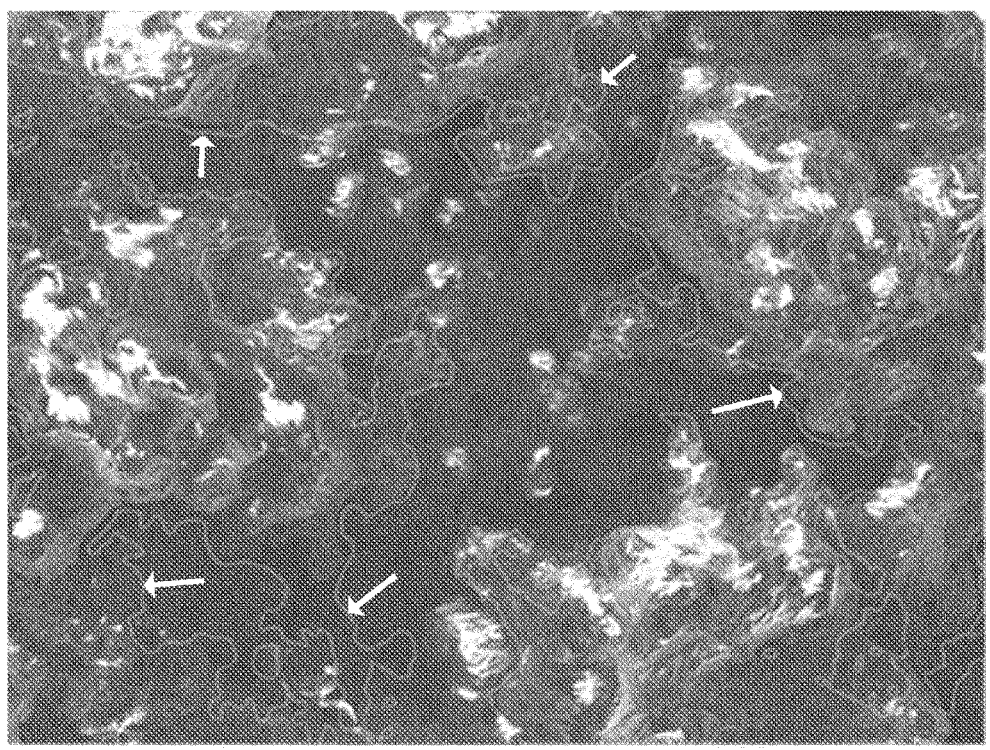
FIG. 17 shows an EDX material map overlaid on an SEM image (plan view) of a CNT-copper composite according to an embodiment of the invention. The field of view is 560 μm ×420 μm. A contour line is also overlaid on the image, indicated at various places in the image using a white arrow. The contour line demits regions where a good copper signal is detected, generally at brighter regions shown in the map. Although not clearly visible, individual dots overlaid in the image represent emission from CNTs, which are generally seen also in the regions were a good copper signal is detected. The signal strength and density is affected by local surface tilt with respect to the sensor.
Figure 18:
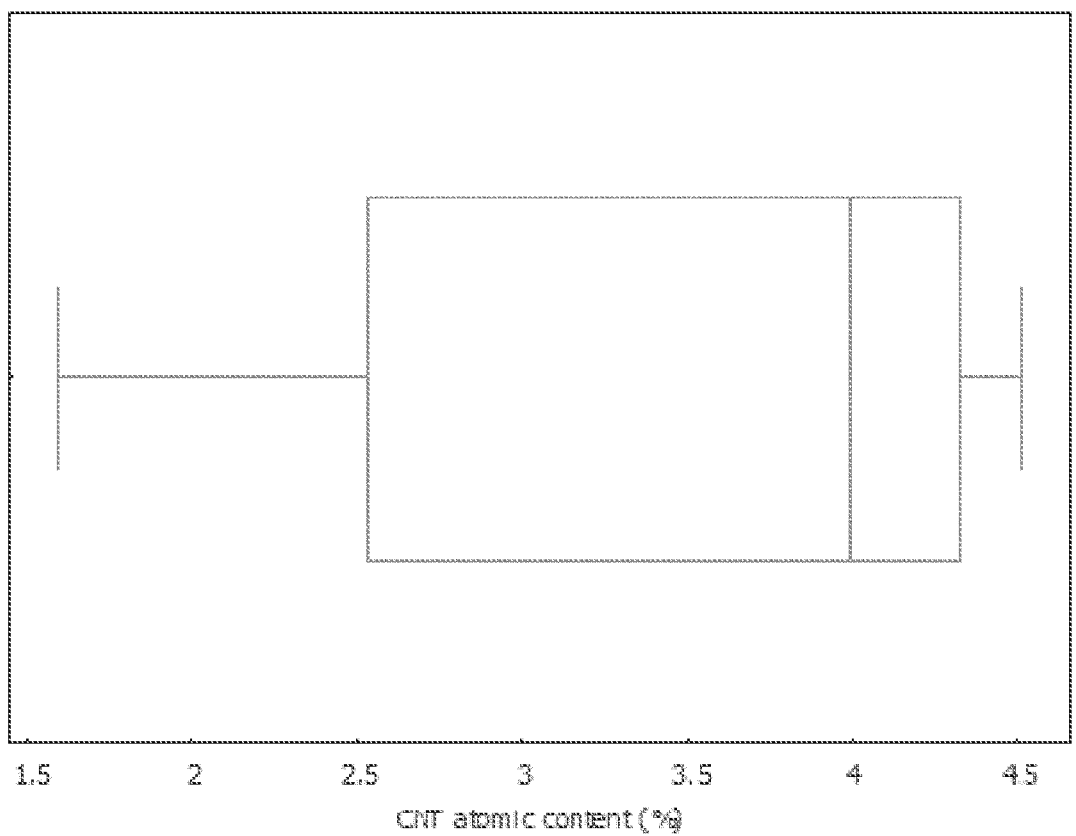
FIG. 18 shows EDX measurements of atomic carbon content from five spectra along the top surface of the CNT-copper composite. The variation of the carbon content can be explained by the relatively small viewing areas for each measurement, being the same as for FIG. 17, i.e. 560 μm ×420 μm.

Determination of the amount and distribution of carbon in the composite layer: EDX (energy-dispersive x-ray spectroscopy) can be effectively used to measure the atomic carbon distribution within the composite. This is despite the penetration depth of the signal and the rough surface. This is illustrated in FIG. 17. Areas of the sample that are out of focus, shadowed, or titled away from the x-ray detector provide a weaker signal. Further, the penetration depth of this technique varies based on electron acceleration voltage (electron penetration depth), density of the material, x-ray diffraction and escape depth, but commonly exceeds 5 μm. This technique can be extended to probe the material composition through the depth of the layer by locally mapping the materials at discrete spots along a cutaway cross-section view. EDX also readily provides quantitative analysis of atomic carbon content in the sample up to the signal penetration depth (FIG. 18). A reduction in standard deviation for the atomic carbon content can be achieved by using larger viewing/collection areas and significantly increased integration times. Even with this approach, an error of ±1-2% of the full scale is typical.

Determining porosity and pore size distribution for the composite layer: Bulk porosity can be easily obtained by estimating the sample, volume and measuring, its weight, while assuming a uniform composite density, A BET tool can be used to measure the pore size distribution of the produced nanocomposites and for large samples it can also be used to determine their surface area (accurate measurements typically require on the order of 10 m$^2$). Lastly, the pore size distribution and the porosity can also be estimated from SEM images. Other methods can be used, such as mercury porosimetry.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above and/or listed below are hereby incorporated by reference.

Non-Patent References

Wonoh Lee, Sang-Bok Lee, Oyoung Choi, Jin-Woo Yi, Moon-Kwang Um, Joon-Hyung Byun, Erik T. Thostenson, Tsu-Wei Chou, "Formicary—like carbon nanotube/copper hybrid nanostructures for carbon fiber-reinforced composites by electrophoreticdeposition" J Mater Sci (2011) 46:2359-2364

Susumu Arai, Morinobu Endo, Norio Kaneko "Ni-deposited multi-walled carbon nanotubes by electrodeposition" Carbon 42(3):641-644, December 2004

Susumu Arai, Takashi Saito, Morinobu Endo "Cu-MWCNT Composite Films Fabricated by Electrodeposition" J. Electrochem. Soc. 2010, volume 157, issue 3, D147-D153

R. Manu and S. Priya "Implication of electrodeposition parameters on the architecture behavior of MWCNT—incorporated metal matrix" Applied Surface Science, Volume 284, 1 Nov. 2013, Pages 270-277

Guangyu Chai, Ying Sun, Jianren 'Jenny' Sun, Quanfang Chen "Mechanical properties of carbon nanotube—copper nanocomposites" Journal of Micromechanics and Microengineering, Volume 18, Number 3 (2008) 035013

R. Manimaran, K. Palaniradja, N. Alagumurthi, J. Hussain "FACTORS AFFECTING THE THERMAL PERFORMANCE OF HEAT PIPE—A REVIEW" Journal of Engineering Research and Studies, JERS/Vol. III/Issue II/April-June, 2012/20-24

P. L. TABERNA, S. MITRA, P. POIZOT, P. SIMON AND J.-M. TARASCON "High rate capabilities Fe$_3$O$_4$-based Cu nano-architectured electrodes for lithium-ion battery applications" nature materials VOL 5 JUL. 2006, p. 567 [doi:1038/nmat1672]

P. Bley, Interdiscip. Sci. Rev. 2013, 188, 267.

X. Jing, D. Chen, D. Fang, C. Huang, J. Liu, X. Chen, Microelectronics J. 2007, 38, 120.

C. T. J. Low, R. G. A. Wills, F. C. Walsh, Surf. Coatings Technol. 2006, 201, 371.

G. Chai, Y. Sun, J. "Jenny" Sun, Q. Chen, J. Micromechanics Microengineering 2008, 18, 35013.

C. Subramaniam, T. Yamada, K. Kobashi, A. Sekiguchi, D. N. Futaba, M. Yumura, K. Hata, Nat. Commun. 2013, 4, 2202.

C. Subramaniam. Y. Yasuda, S. Takeya, S. Ata, A. Nishizawa, D. Futaba, T. Yamada, K. Hata, Nanoscale 2014, 6, 2669.

The invention claimed is:

1. A process for manufacturing a composite layer of carbon nanotubes and metal, the process comprising the steps:

providing carbon nanotubes;

dispersing the carbon nanotubes in an electrolyte solution;

providing a working electrode and a counter electrode comprising the metal, each in contact with the electrolyte; and electroplating the working electrode with the carbon nanotubes and metal to grow the composite layer at a rate of change of thickness of the composite layer of at least 10 μm/min to a thickness of at least 10 μm;

wherein, for at least a part of the process, the composite layer of thickness of at least 10 μm has a density ratio satisfying:

$$\frac{\rho_{layer}}{\rho_{metal}} \leq 0.35$$

where $\rho_{layer}$ is the bulk density of the composite layer of thickness of at least 10 μm, including any voids that are present in the composite layer and $p_{metal}$ is the volumetric mass density material property of the metal.

2. The process according to claim 1 wherein, during electroplating the working electrode with the carbon nanotubes and metal to grow the composite layer at a rate of change of thickness of the composite layer of at least 10 μm/min, the rate of change of area density is at most 0.8 kg/m$^2$/min.

3. The process according to claim 1 wherein the carbon nanotubes are functionalised with at least one selected from the group consisting of:

Hydroxyl, Phenol, Carbonyl, Carboxylate, Carboxyl, Phosphate, Phosphono, Sulfonic acid, Sulfhydryl, Sulfide, Disulfide, Amino, Quaternary ammonium.

4. The process according to claim 3 wherein the degree of functionalisation of the carbon nanotubes is at least 1 wt %.

5. The process according to claim 1 wherein the electrolyte, at least at the start of deposition, contains at least 0.0001 wt % carbon nanotubes.

6. The process according to claim 1 wherein the electrolyte, at least at the start of deposition, contains not more than 0.2 wt % carbon nanotubes.

7. The process according to claim 1 wherein the electrolyte, at least at the start of deposition, has a concentration of the metal in the range 0.05-1.2 M.

8. An electroforming process comprising the steps:
carrying out a process according to claim 1 to manufacture a composite layer of carbon nanotubes and metal;
carrying out additional electroplating of a metal into the composite layer to produce an electroformed product.

* * * * *